United States Patent [19]
Yasutomi et al.

[11] Patent Number: 5,876,659
[45] Date of Patent: Mar. 2, 1999

[54] PROCESS FOR PRODUCING FIBER REINFORCED COMPOSITE

[75] Inventors: Yoshiyuki Yasutomi, Mito; Shigeru Kikuchi, Ibaraki-ken; Yukio Saito; Kunihiro Maeda, both of Hitachi, all of Japan

[73] Assignee: Hitachi, Ltd., Tokyo, Japan

[21] Appl. No.: 898,462

[22] Filed: Jul. 24, 1997

Related U.S. Application Data

[62] Division of Ser. No. 658,390, Jun. 5, 1996, abandoned, which is a continuation of Ser. No. 264,648, Jun. 23, 1994, abandoned.

[30] Foreign Application Priority Data

Jun. 25, 1993 [JP] Japan ................................ 5-196656
Nov. 18, 1993 [JP] Japan ................................ 5-289058

[51] Int. Cl.$^6$ ........................................ B28B 1/52
[52] U.S. Cl. ................... 264/638; 264/640; 164/461; 164/97; 164/91
[58] Field of Search .................. 264/640, 638; 164/461, 97, 91

[56] References Cited

U.S. PATENT DOCUMENTS

| | | | |
|---|---|---|---|
| 5,023,041 | 6/1991 | Jones et al. | 264/510 |
| 5,547,628 | 8/1996 | Lacombe et al. | 264/257 |
| 5,643,514 | 7/1997 | Chwastiak et al. | 264/640 |

Primary Examiner—Christopher A. Fiorilla
Attorney, Agent, or Firm—Antonelli, Terry, Stout & Kraus, LLP

[57] ABSTRACT

Fiber bundle reinforced composite material useful for various high temperature structural members having excellent strength, toughness and resistance to oxidation and a process for producing the same. The fiber bundle reinforced composite material is reinforced with fiber bundles each having a plurality of continuous inorganic fibers bundled with medium such as carbon, being oriented in one, two or three directions, or randomly in the matrix which is reinforced with nano-sized particles precipitated. The fiber bundle reinforced composite material has a desired orientation of fibers and enables production of fiber bundle reinforced composite members having excellent strength and toughness.

6 Claims, 22 Drawing Sheets

SiC-C SHORT FIBER BUNDLE REINFORCED CERAMICS

C SHORT FIBER DISPERSED SiC CERAMICS

PROCESS FOR PRODUCING FIBER REINFORCED COMPOSITE

This application is a Divisional application of application Ser. No. 08/658,390, filed Jun. 5, 1996, now abandoned, which application is a Continuation application of application Ser. No. 08/264,648, filed Jun. 23, 1994 (now abandoned).

BACKGROUND OF THE INVENTION

1. Field of the Invention

The present invention relates to a process for producing a ceramic reinforced with fiber useful as materials for heat-resistant parts requiring high thermal durability such as gas turbine members (combustor and the like), nuclear fusion furnace walls, space system members (tiles for space return craft and the like); materials for structural members requiring high strength and rigidity such as aeroplane members and internal combustion engine parts; and various slidable parts.

2. Description of the Related Art

Development of high temperature structural materials is an indispensable technical requirement for improvement of members such as those for gas turbines, nuclear fusion furnaces, aerospace system and the like. These structural members are inevitably susceptible to high thermal load and thermal impact, and therefore, required to be structured with a material having excellent high temperature strength and thermal impact resistance.

A great interest has been directed to ceramics as high temperature materials, but the ceramics alone are brittle enough to have a low reliability and do not satisfy the above requirements for high temperature structural materials, which discourages the ceramics to put in practical use.

An attempt has been made to overcome the above difficulties by developing a composite material comprising a matrix having reinforcing fibers dispersed therein. For the reinforcing fibers light weight inorganic fibers having thermal durability (ceramic fibers) are suitable in view of the objects and applications of the composite materials. Some fiber reinforced ceramics have been proposed which have mostly a composite structure comprising a matrix having starting short fibers dispersed therein. However, the short fibers are liable to scatter into air in the process for production thereof causing serious problems from the standpoints of safety and environmental health hazards.

On the other hand, attention has been focused to a technique of dispersing nano-sized particles in a matrix in to improve the strength of the ceramics. There is, however, a problem that the necessity of using the nano-sized particles limits starting materials and adds to cost.

In order to use ceramics as high temperature structural materials, it is indispensable to enhance their reliability which requires a compatibility of high strength and high toughness. Specifically there are desired such materials as exhibiting non-linear fracture configuration which is capable of suppressing propagation of cracks, thereby inhibiting abrupt destruction. As means of achieving such materials one may make mention of a process for reinforcing ceramics by forming a composite of the ceramic matrix with short inorganic fibers as reinforcing material as well as a process for dispersing nano-sized particles in a matrix to be reinforced.

The reinforcement of composite ceramic matrix with inorganic fibers as reinforcing material tends to increase deficiencies such as stress concentration at ends of the fibers which may cause reduction in strength property for the structure where only short fibers are dispersed in the ceramic matrix. For the composite structure, therefore, such a structure as having long continuous fibers oriented in a matrix is desired.

The orientability of reinforcing fibers has fundamentally a great influence on the properties of resultant composite materials. For this reason, the orientability of fibers should be taken into consideration and controlled depending upon the application and desired characteristics of the resultant composite materials. Dispersing uniformly short fibers of a few micrometers in diameter throughout a matrix may be technically difficult. The short fibers of a few micrometers in diameter are apt to scatter into air and may adversely affect human body by aspiration and the like. Therefore, there is a need of a method without using short fibers as starting material.

On the other hand, the dispersion of nano-sized particles requires the use of nano-sized raw materials which in turn limits raw materials to be used, resulting in a sintered body in the form of restricted dispersion. Moreover, the raw materials must be reduced in size causing a problem of high costs so that there is a need for a method of dispersing nano-sized particles, other than the conventional methods.

SUMMARY OF THE INVENTION

An object of the present invention is to provide a fiber reinforced composite material having a reliability as a high temperature material.

Another object of the present invention is to provide a process for producing such a fiber reinforced composite material.

Still another object of the present invention is to provide a member made with the aforementioned fiber reinforced composite material.

DETAILED DESCRIPTION OF THE INVENTION

The present inventors devised a process where a plurality of continuous inorganic fibers are bundled in one direction using an inorganic compound as a medium, which bundles are orientated uniformly in a ceramic or a metal. As a result, it has been found that the inorganic fiber bundles fixed with the medium have a sufficient handling property to achieve a uniform orientation in a specific direction in the ceramic or metal, and that the orientation of fibers can be easily realized with the stress generated between the fibers and the ceramic being reduced. Based on this discovery, the fiber reinforced composite materials to achieve the aforementioned objects in accordance with the present invention have a composite structure where a plurality of continuous inorganic fibers are bundled in the same direction using an inorganic compound as a medium, which bundles are oriented in a specific direction in a ceramic or metal.

The inorganic fiber bundles as described above can be varied in diameter with the number of fibers to be bundled (a few to several thousands) as illustrated later in Examples. The present inventors have made an attempt to manufacture several kinds of fiber bundle reinforced composite materials with inorganic fiber bundles of varying diameters and investigate the strength properties at room temperature of the composite materials. As a result, it has been found that by controlling the content of fiber bundles and the diameter thereof in the resulting composite materials the residual stress owing to a difference in thermal expansion coefficient between the fiber bundles and the matrix of the composite materials can be reduced to increase the strength of the composite materials. The composite structure of the fiber reinforced composite materials with the aforementioned inorganic fiber bundles according to the present invention can effectively serve to enhance the strength properties by controlling the diameter of the inorganic fiber bundles and the content thereof.

Figure 1A:
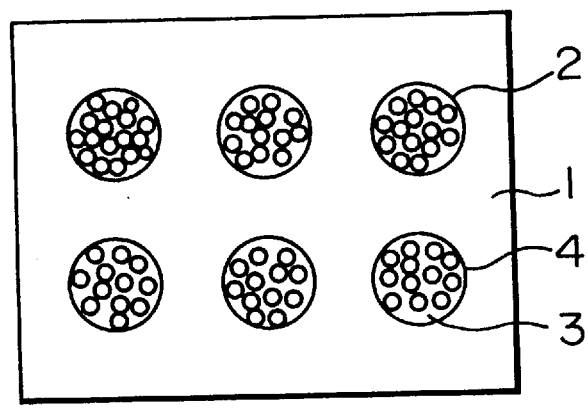
FIGS. 1A to 1C are a schematic cross-sectional view of a composite structure where a medium component is different from a matrix component.
Figure 1B:
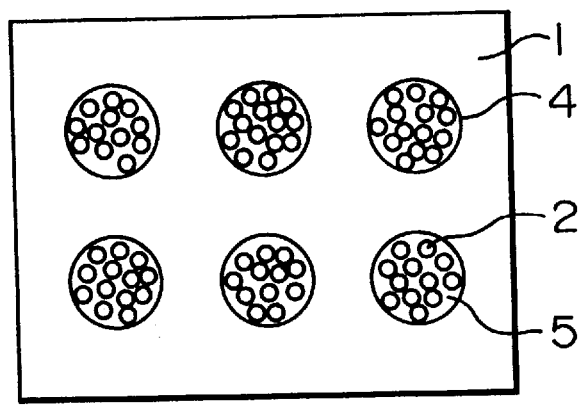
Figure 1C:
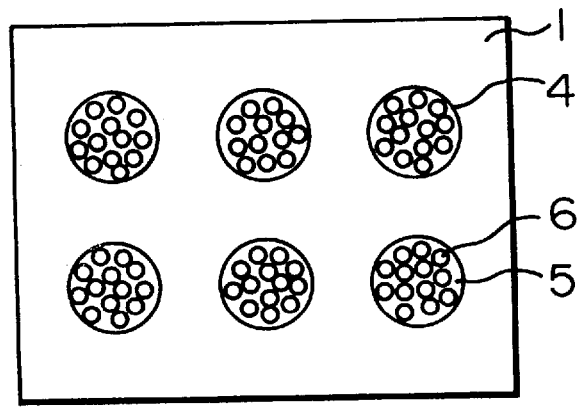

Moreover, the present inventors have made a research to production of a fiber reinforced composite material comprising a ceramic or metal matrix having long inorganic fibers oriented uniformly in one direction therein, and in the course of the research found a problem that it is very difficult to orient uniformly inorganic fibers of a few micrometers in diameter in the matrix in the process of production. As one of measures to overcome the difficulties, the present inventors devised a process comprising arranging a plurality of long inorganic fibers in the direction into a bundle using a medium and disposing the bundles uniformly oriented in the matrix and made samples by the process. As a result, it has been found that the bundles of inorganic fibers bonded with the medium have a sufficient handling property to achieve a uniform orientation in a specific direction in the matrix and that the orientation of fibers can be easily realized. On the basis of this discovery, the fiber reinforced composite materials to achieve the aforementioned objects in accordance with the present invention have a composite structure where a plurality of inorganic fibers are bundled in the same direction using an inorganic compound as a medium, which bundles are uniformly disposed to orient in a specific direction in a matrix. The composite structure will be described in detail with reference to drawings. FIGS. 1A, 1B and 1C are a schematic cross-sectional view of a composite structure where the medium component is different from the matrix component.

Assuming three components, a, b, and c for constituting a matrix, inorganic fibers and medium, the structures shown in FIGS. 1A, 1B and 1C comprise a matrix 1 consisting of a component, a, an inorganic fiber 2 consisting of a component, b, a medium 3 consisting of a component, c, an inorganic fiber bundle 4, a medium 5 consisting of a component, b. and an inorganic fiber 6 consisting of a component, a. In FIGS. 1A, 1B and 1C, the inorganic fiber bundles are disposed perpendicularly to the sheet plane. When the medium component is different from the matrix component, there may be considered three types of combination as shown in FIGS. 1A, 1B and 1C, in each of which the matrix is clearly distinguishable from the inorganic fiber bundles by the medium. In contrast, FIGS. 2A and 2B show a schematic cross-sectional view of a composite structure where the medium component is the same as the matrix component.

Figure 2A:
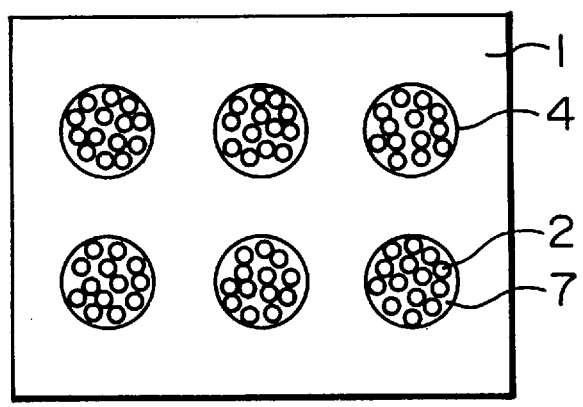
FIGS. 2A and 2B are a schematic cross-sectional view of a composite structure where a medium component is the same with a matrix component.
Figure 2B:
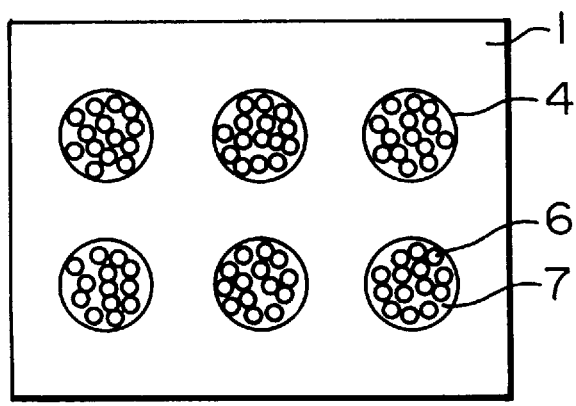

The structures shown in FIGS. 2A and 2B have a medium 7 consisting of a component, a, where the inorganic fiber bundles are disposed perpendicularly to the sheet plane as in FIGS. 1A, 1B and 1C. When the medium component is the same with the matrix component, the fiber bundle reinforced composite materials according to the present invention are characterized in that a plurality of inorganic fibers are present in the aggregated form, i.e., a group of fibers and the groups of fibers are almost uniformly distributed throughout the matrix, though such a structure becomes similar to a composite structure where inorganic fibers are present distributed in a matrix. The composite structures shown in FIGS. 2A and 2B may be considered to be produced even by forming a composite of a plurality of inorganic fibers and a matrix component without using a medium because the medium component is the same with the matrix component. However, when actually produced in such way, the resulting composites have in most cases insufficient filling with the matrix component between the inorganic fibers, resulting in formation of deficiencies such as voids. Therefore, it is desirable to use fiber bundles previously formed with a medium.

The inorganic fiber bundles as described above can be varied in their diameter depending upon the number of fibers to be bundled. The present inventors made samples of several kinds of fiber bundle reinforced composite materials which were tested for mechanical characteristics at room temperature. As a result, it has been found that by controlling the content of fiber bundles and the diameter thereof in the resulting composite materials, the strength and toughness of the composite materials are increased. The results of the investigation on mechanical characteristics and the appropriate ranges of inorganic fiber bundles derived from the results are discussed in detail under.

First, when the matrix is ceramic, an attempt has been made to produce several composite materials having fiber bundles oriented in one direction with varying components of the matrix, inorganic long fibers, and mediums. The procedure of production is described in detail in Example later. In the course of production, the number of fibers to be used was varied to produce fiber bundles having a varying diameter. A number of fibers lower than 20 resulted in inconvenient handling of fiber bundles in the production thereof, indicating that the number of fiber should be desirably more than 20. In such case, the diameter of fiber bundles are approximately 0.05 mm though varying with the type of fibers or mediums to be used. A diameter not less than 0.05 mm has been found to be sufficient in handling for production of the composites. It is preferred that the inorganic fiber bundles have an aspect ratio of no less than 1200 and contain 20 or more fibers.

The precursors which can be converted by heating into C, SiC, TiC, BN, $Si_3N_4$, $B_4C$, $SiO_2$, $TiO_2$, $Al_2O_3$, $B_2O_3$, $Ta_2O_5$, that is, phenolic resins, or metallopolymers such as boronyl pyridine, ammonioborane, polysilazane, tetra-i-propoxysilane, tetra-i-propoxy titanium, tri-n-propoxy aluminum, penta-i-propoxy tantalum, polycarbosilane, polyaluminoxane. polyborosiloxane, polysilastyrene, polycarborane siloxane, polysilane, polytitanocarbosilane, heptamethylvinyltrisilane, polyborodiphenylsiloxane, and the like can be used to bundle continuous fibers.

The fibers may be impregnated with each precursor and heated to produce fiber bundles with the medium component formed from the precursor. In combinations of fibers and medium, a combination of nonoxides with oxides is less desirable because when heated subsequently at high temperatures in the course of composite formation too vigorous reaction may occur therebetween with a possibility of degradation in characteristics of fiber bundles, though the production of fiber bundles is possible. Therefore, combinations of non-oxides with non-oxides, or oxides with oxides are preferred. However, the reaction may be suppressed to some extent by coating the surfaces of the fibers with less reactive materials such as BN. Fiber bundles consisting of two or more types of fiber can be similarly produced. The production of fiber bundles may be accomplished by impregnation with medium components in a slurry or in a chemical vapor phase rather than by the impregnation with the precursors and subsequent heating as described above.

Figure 3:
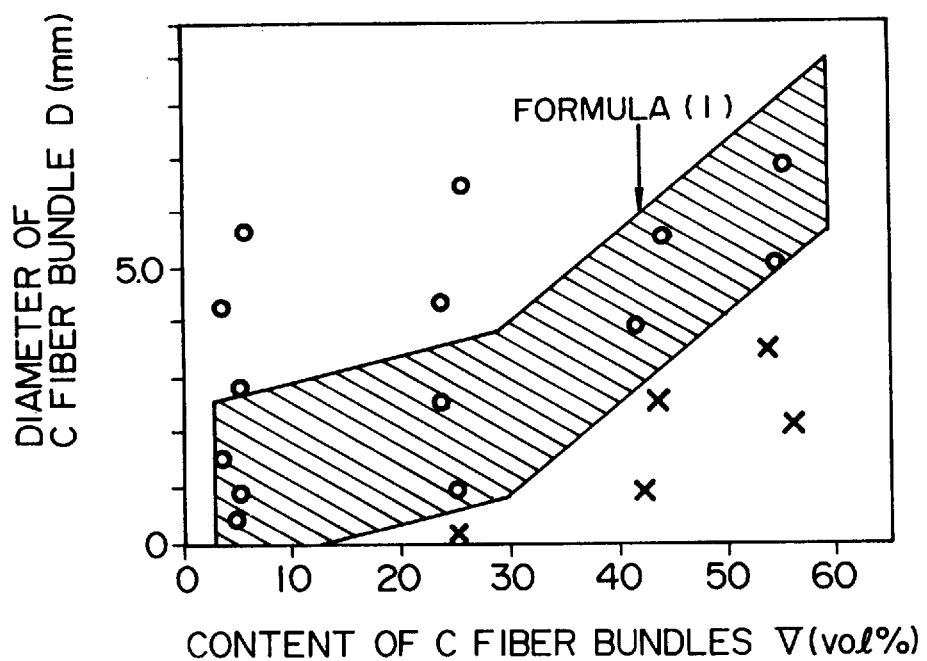
FIG. 3 is a graph showing a relationship between the diameter of bundles and the content thereof in a SiC matrix-C fiber bundle reinforced composite material.
Figure 4:
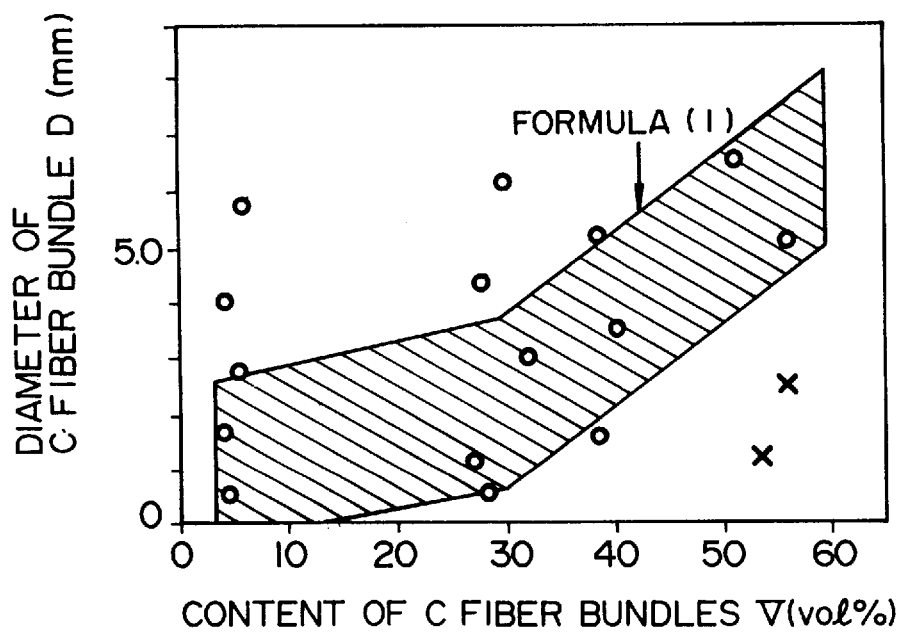
FIG. 4 is a graph showing a relationship between the diameter of bundles and the content thereof in a $Si_3N_4$ matrix-C fiber bundle reinforced composite material.
Figure 5:
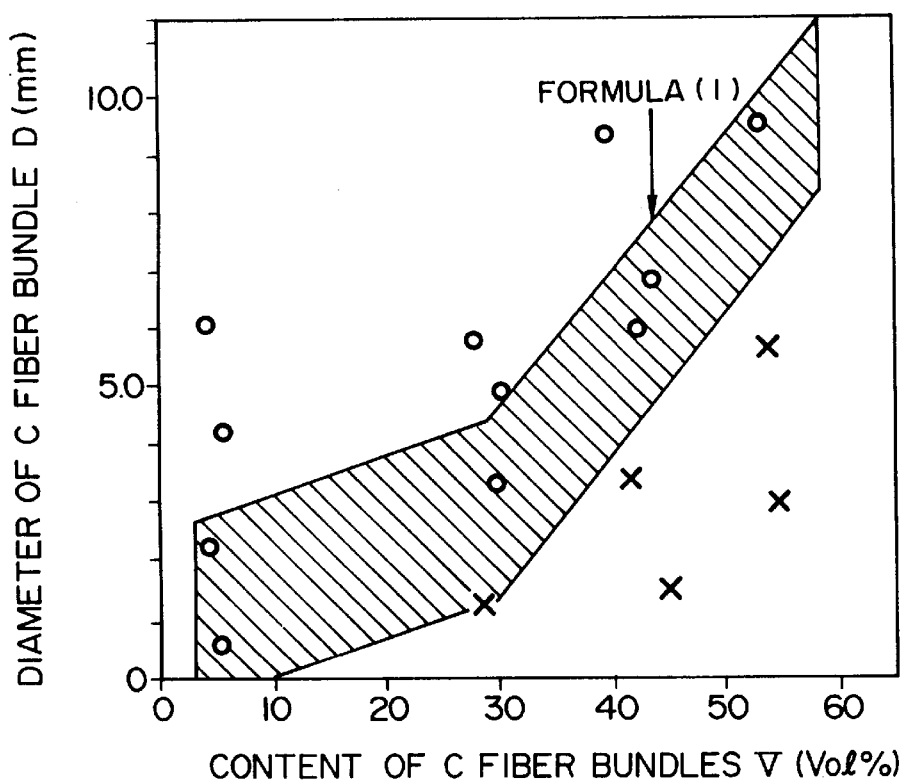
FIG. 5 is a graph showing a relationship between the diameter of bundles and the content thereof in a $ZrB_2$ matrix-C fiber bundle reinforced composite material.
Figure 6:
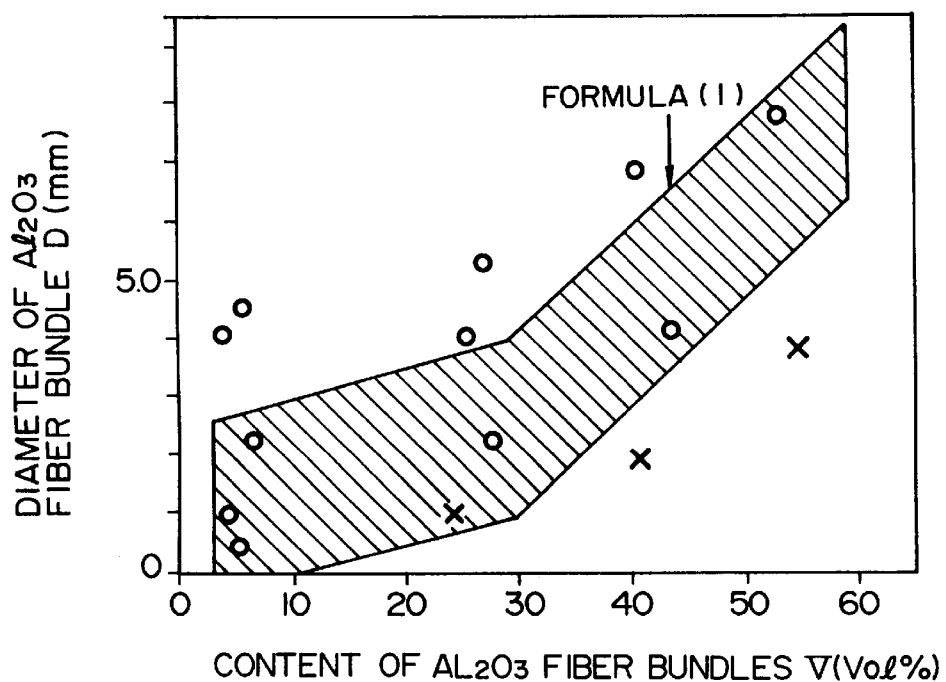
FIG. 6 is a graph showing a relationship between the diameter of bundles and the content thereof in a MgO matrix-$Al_2O_3$ fiber bundle reinforced composite material.

When the produced composite ceramics have a higher thermal expansion coefficient ($\alpha_m$) than that of the inorganic fiber bundles ($\alpha_f$), the residual stress developed owing to the difference in thermal expansion coefficient therebetween after sintering may cause cracks in the matrix of the resulting composite materials. Of a variety of types of composite materials produced, the results of the investigation with representative composite materials in case $\alpha_m > \alpha_f$ for crack occurrence are shown in FIGS. 3 to 6, wherein FIG. 3 shows the results for SiO matrix-C fiber bundle composite materials, FIG. 4 shows those for $Si_3N_4$ matrix-C fiber bundle composite materials, FIG. 5 shows those for $ZrB_2$ matrix-C fiber bundle composite materials, and FIG. 6 shows those for MgO matrix-$Al_2O_3$ fiber bundle composite materials. In these FIGS., those designated × caused cracking, while those designated ○ did not.

Form the above findings, when a matrix is ceramic with $\alpha_m > \alpha_f$, the diameter of inorganic fiber bundles should preferably be not less than 0.05 mm and in the range as expressed by the following formula (1):

$$D'-0.05 \leq D \leq D'+3.0 \quad (1)$$

where D represents the diameter of inorganic fiber bundles (mm), D' represents the value obtained by the following formulae (2) and (3):

$$\text{With } V=3 \text{ to } 30, D'=(0.011V-0.023)\times\Delta\alpha\times10^6 \quad (2)$$

$$\text{With } V=30 \text{ to } 60, D'=(0.0375V-0.818)\times\Delta\alpha\times10^6 \quad (3)$$

where V represents the content of inorganic fiber bundles in terms of % by volume, and $\Delta\alpha$ represents the difference in thermal expansion coefficient between the ceramic matrix and the inorganic fiber bundle.

Figure 7:
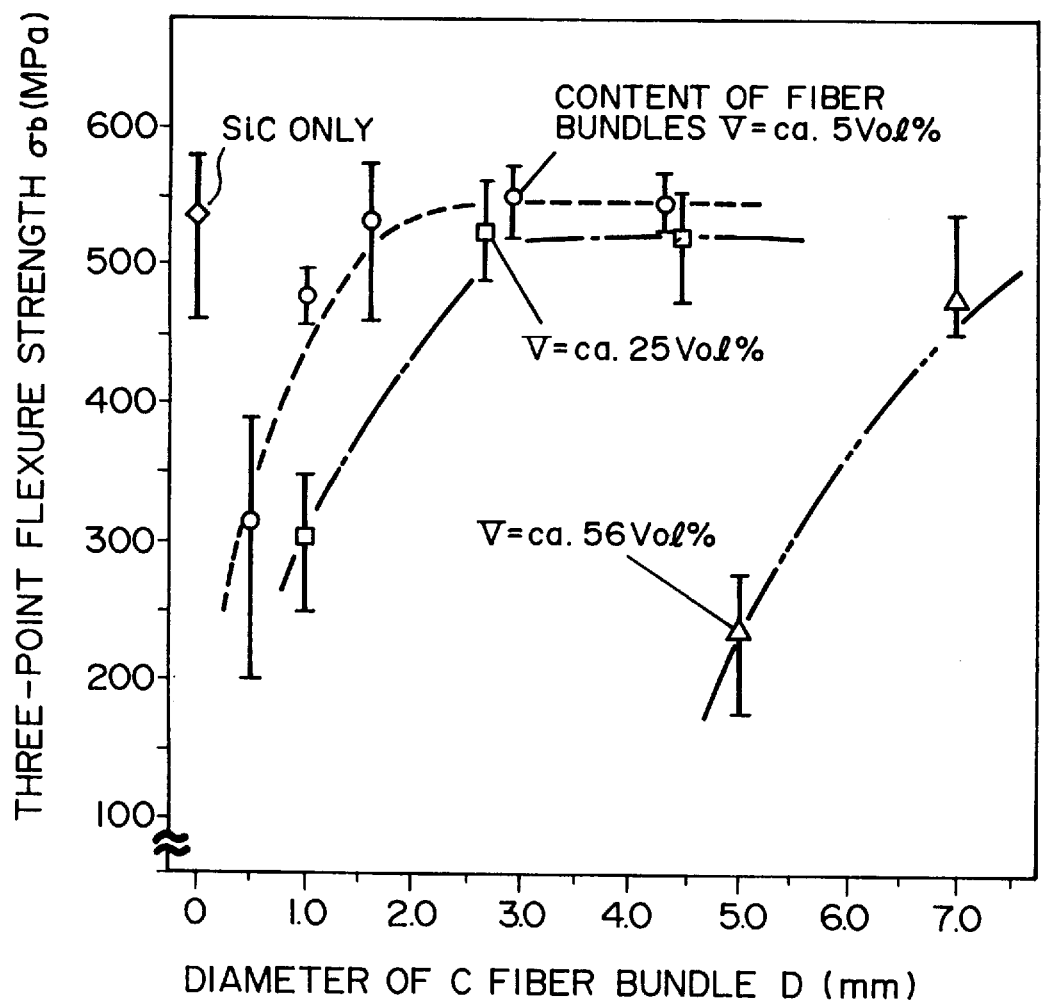
FIG. 7 is a graph showing the three point probe flexural strength at room temperature of a SiC matrix-C fiber bundle reinforced composite material as a function of the diameter of the C bundles.

The value of D' in the formulae (2) and (3) is an approximate critical diameter of the inorganic fiber bundles, with which the composite materials can be produced, and determined by the content of inorganic fiber bundles (V) and the difference in thermal expansion coefficient between the inorganic fiber bundle and the matrix ($\Delta\alpha$). The lower limit, D'−0.5, of the diameter of the inorganic fiber bundles D is the value obtained from the results as shown in FIGS. 3 to 6 taking account of the fluctuation in diameter of the inorganic fiber bundles used in the composite materials. The upper limit, D'+3.0, of the diameter of the inorganic fiber bundles D was obtained by measuring strengths of several types of the produced composite materials and determining an effective area for improving the strength as a function of the diameter. This will be explained with reference to the SiC matrix-C fiber bundle composite materials as shown in FIG. 3. In FIG. 7, there is shown the results of the measurement of flexural strength by the three point probe technique at room temperature for the SiC matrix-C fiber bundle composite materials. It can be seen from FIG. 7 that the flexural strength increases with the diameter of the fiber bundles though at all the content of the fiber bundles, the flexural strength reaches almost the same level of the SiC alone at a certain value of the diameter with no further improvement in the flexural strength being expected. This tendency is also observed in other types of composite materials with different components, and the critical diameter, above which no improvement in strength is achieved, is a value of about 3.0 mm larger than the D' expressed by the above formulae (2) and (3) for any composite materials of any component families. Based on this finding, the upper limit of the diameter of inorganic fiber bundles D should be D'+3.0 mm.

In case $\alpha_m \leq \alpha_f$, the residual stress in the matrix after sintering was compressive causing no cracking. Tensile stresses remain in the fiber bundles. However, each inorganic fiber bundle has a higher strength than the ceramic matrix so that there is no fear of development of failure from the stresses. Therefore, when $\alpha_m \leq \alpha_f$, the diameter of inorganic fiber bundles should be not less than 0.05 mm.

Figure 8:
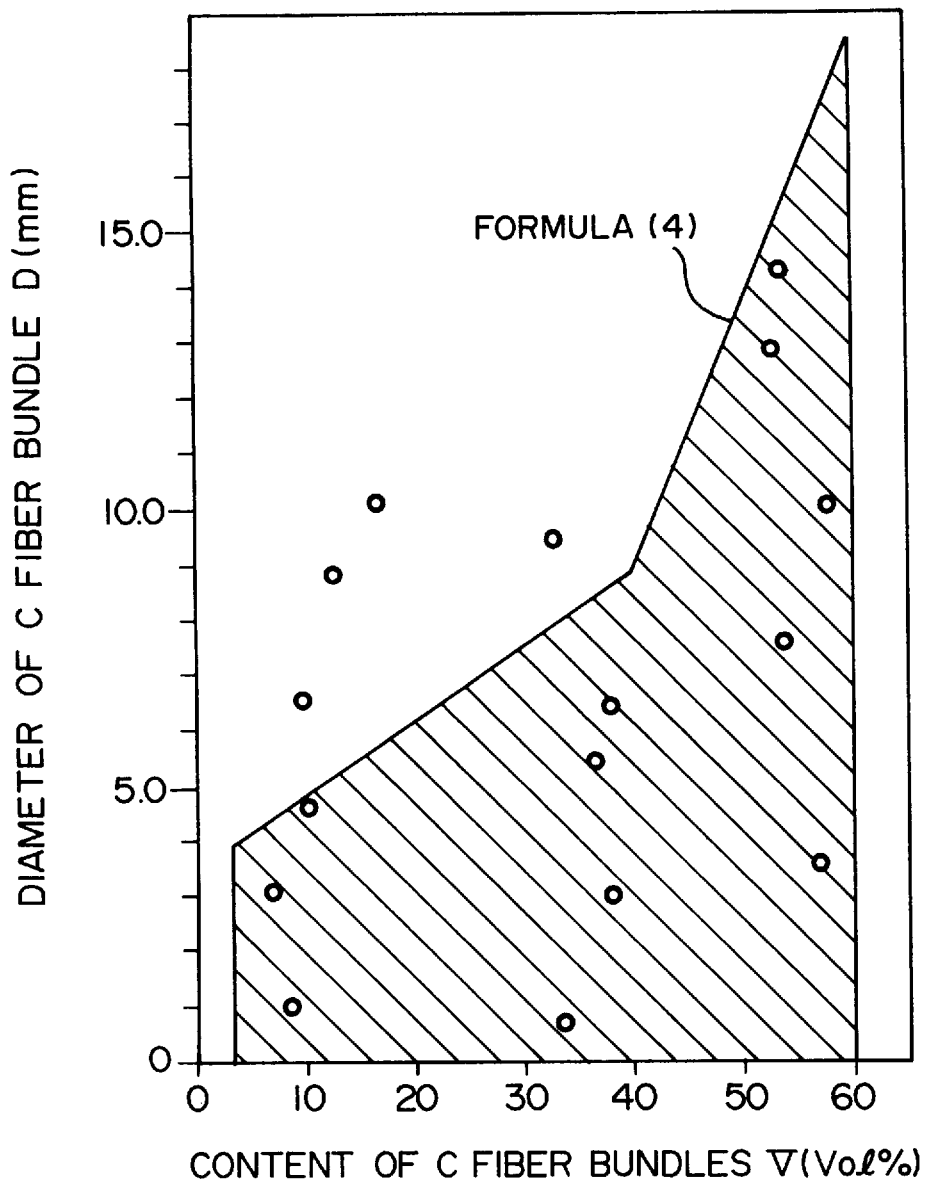
FIG. 8 is a graph showing a relationship between the diameter of bundles and the content thereof in a Cu matrix-C fiber bundle reinforced composite material.
Figure 9:
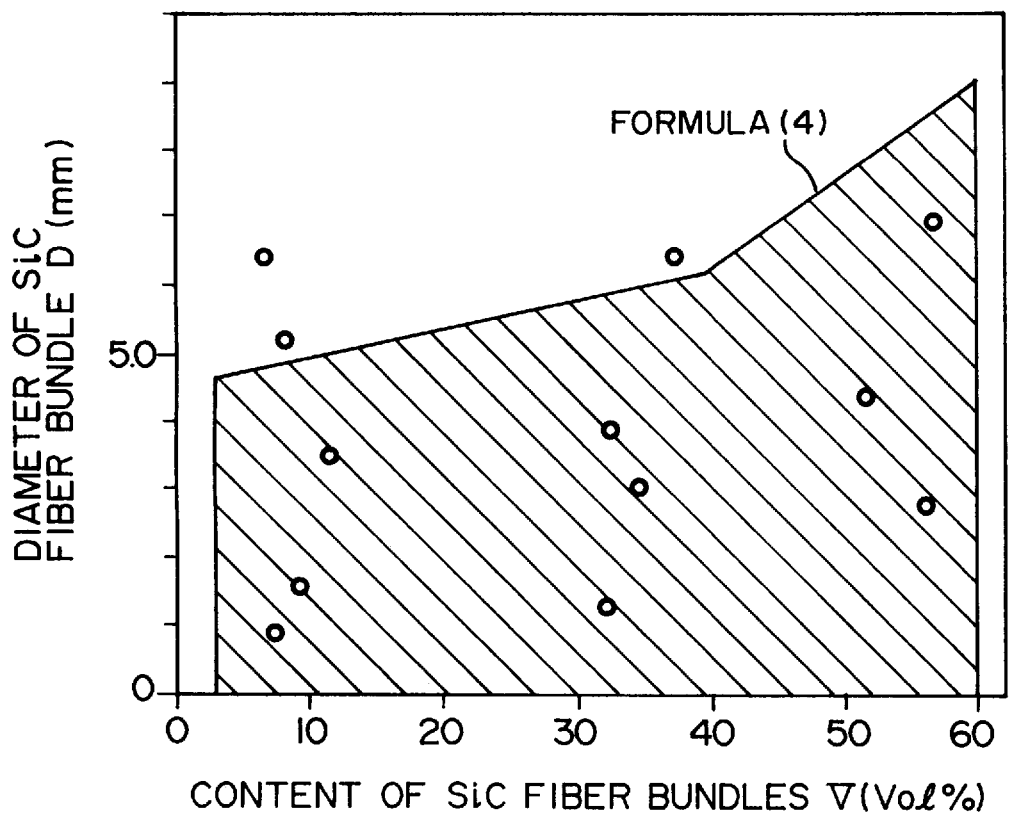
FIG. 9 is a graph showing a relationship between the diameter of bundles and the content thereof in a Ti matrix-SiC fiber bundle reinforced composite material.

Similarly several types of composite materials with metal matrix were produced. Representative examples of the production are illustrated in FIGS. 8 and 9. The process of production will described in detail later in Examples. FIG. 8 shows the results in the case of Cu matrix-C fiber bundle composite materials produced, while FIG. 9 in the case of Ti matrix-SiC fiber bundle composite materials.

Figure 10:
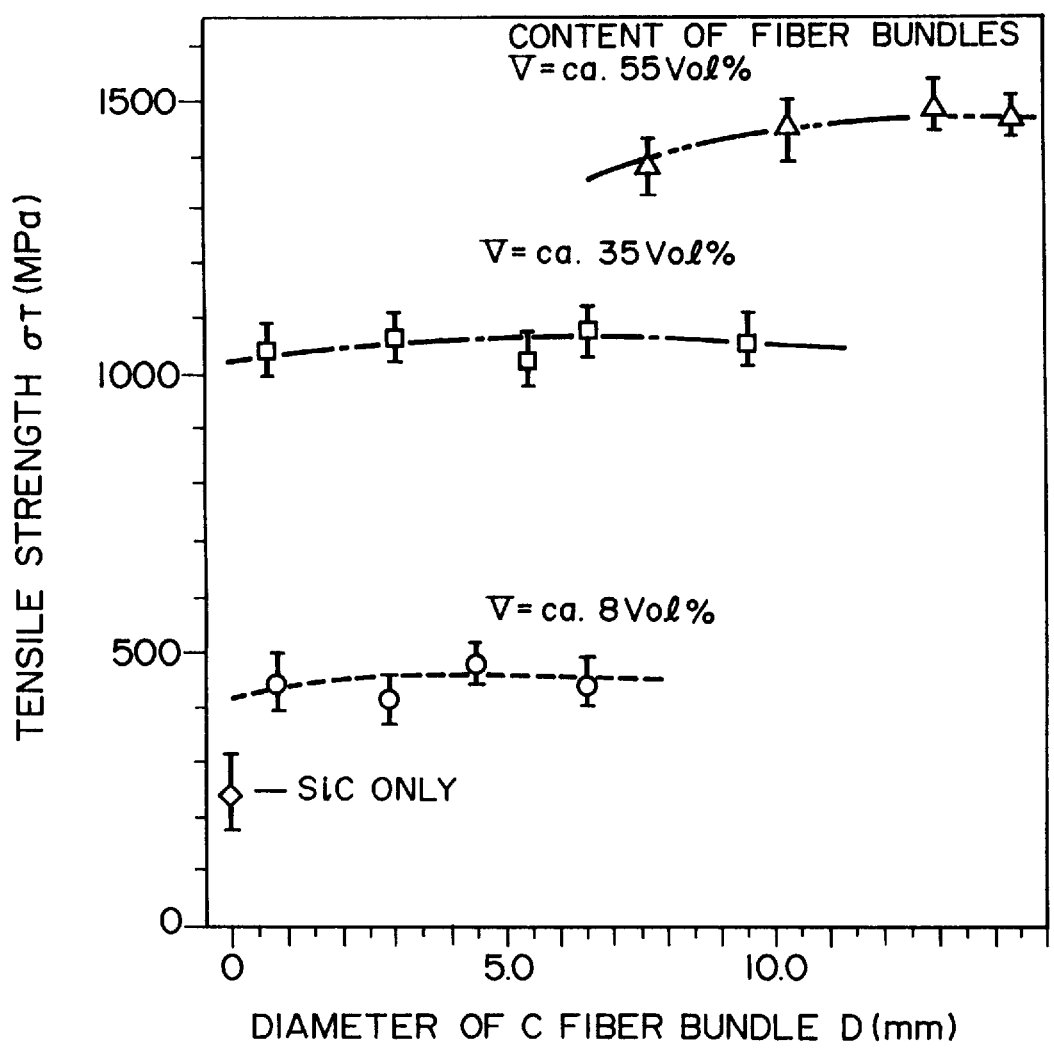
FIG. 10 is a graph showing the tensile strength of a Cu matrix-C fiber bundle reinforced composite material as a function of the diameter of the C bundles.

Metals have a high thermal expansion coefficient with $\alpha_m > \alpha_f$ in most cases and the metal matrix was not susceptible to cracking owing to its ductility though residual tensile stresses were generated therein due to the difference in thermal expansion coefficient between the metal matrix and the inorganic fiber bundle. The several types of composite materials produced were evaluated for tensile strength at room temperature. As an example, the Cu matrix-C fiber bundle composite materials as shown in FIG. 8 were evaluated for tensile strength and the results thereof are shown in FIG. 10. As can be seen from FIG. 10, there is observed a tendency that the tensile strength varies to a great extent depending upon the content of fiber bundles, but it is only slightly increased with the diameter of fiber bundles. This is considered attributable to the fact that the metal is ductile to reduce the generated stress down to a certain low level of residual stress, which is relaxed by enlarging the diameter of fiber bundles resulting in an slight increase in strength. However, there is a certain value of diameter, above which little increase in strength is achieved. This tendency occurs similarly in the composite materials of other component systems, and the value is approximately 5.0 mm larger than D' expressed by the formulae (5) and (6) below. Moreover, a diameter of fiber bundles of not smaller than 0.05 mm, but not larger than 10 mm affords good handling property and a higher strength than that of the matrix component alone. From the forgoing, the diameter of inorganic fiber bundles is desirable in the range expressed by the following formula (4):

$$0.05 \leq D \leq D' + 5.0 \quad (4)$$

where D is the diameter of fiber bundles (mm), and D' is the value expressed by the formulae (5) and (6):

$$\text{With } V=3 \text{ to } 40, D'=(0.008V-0.1) \times \Delta\alpha \times 10^6 \quad (5)$$

$$\text{With } V=40 \text{ to } 60, D'=(0.026V-0.776) \times \Delta\alpha \times 10^6 \quad (6)$$

The present inventors have discovered that enlarging the diameter of fiber bundles according to the above formulae (1) and (4) enables an increase in rupture toughness of the composite materials. As an example, the results of rupture toughness measurements of samples of the SiC matrix-C fiber bundle composite materials shown in FIG. 3 with the content of fiber bundles being about 5% by volume are shown in FIG. 11.

Figure 11:
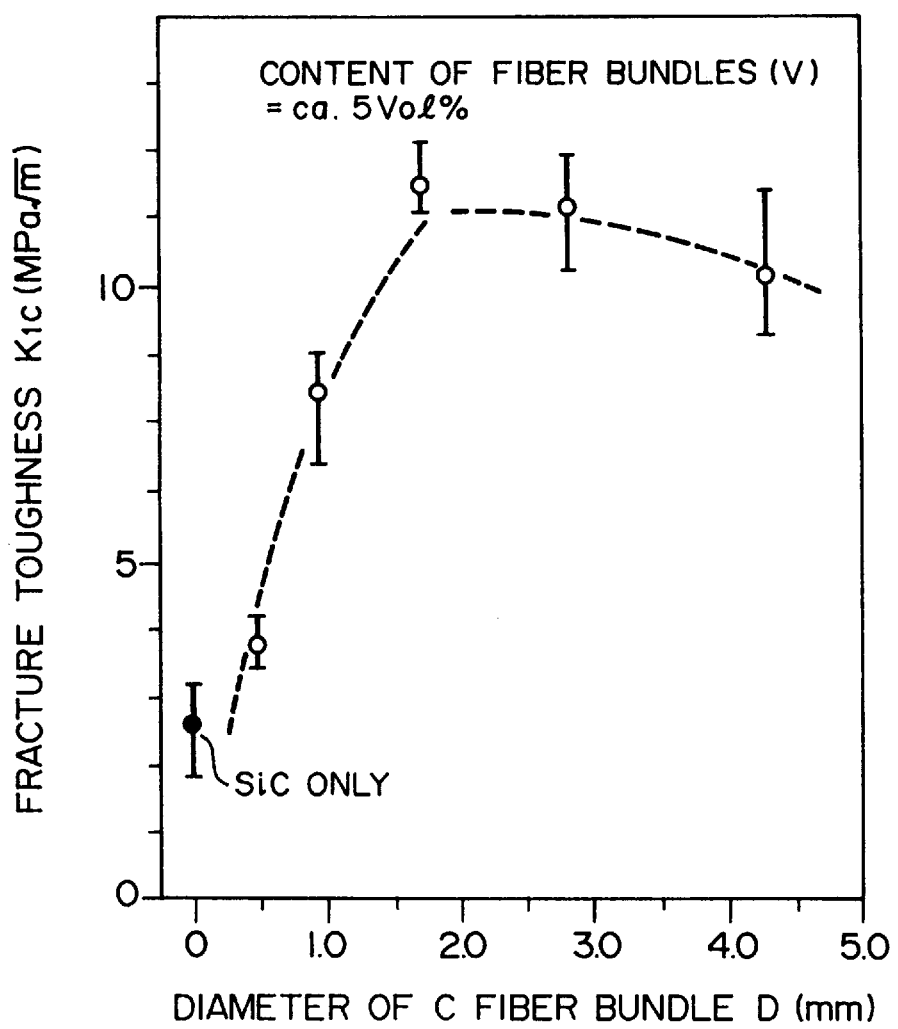
FIG. 11 is a graph showing the rupture toughness of a SiC matrix-C fiber bundle reinforced composite material as a function of the diameter of the C bundles.

As can be seen from FIG. 11, the toughness is improved with increasing the diameter of fiber bundles in the range expressed by the above formula (1). This trend could be found in other component systems of composite materials.

From the foregoing, the fiber bundle reinforced composite materials with inorganic fiber bundles according to the present invention have a composite structure which can effectively serve to improve the strength and toughness by controlling the diameter and content of inorganic fiber bundles. The inorganic fiber bundles according to the present invention should desirably be controlled to have a diameter in the range expressed by the above formulae (1) and (4) in both cases of the ceramic and the metal matrix. A larger diameter of the fiber bundles than the above defined range, though no problem occurs in the production thereof, may cause speckled distribution of the fiber bundles in the matrix, resulting in less effective reinforcement with the fiber bundles such as less improvement in toughness. Therefore, the diameter of fiber bundles should desirably be in the range expressed by the above formulae (1) and (4). Similarly a content of fiber bundles less than 3% by volume leads to speckled distribution of the fiber bundles resulting in less effective reinforcement with the fiber bundles, and therefore the content should desirably be in the range of 3 to 60% by volume. The inorganic fiber bundles are desired to have none of faults which may be generated from a reaction with matrix components. The reactions of the inorganic fiber bundles and the matrix may be avoided by providing an inert intermediate layer therebetween.

On the other hand, a process for producing the fiber bundle reinforced composite materials in order to achieve the aforementioned objects in accordance with the present invention comprises, when the matrix is ceramic, forming matrix components into a green sheet, disposing inorganic fiber bundles in an alignment on the green sheet, on which further a green sheet is superimposed, and repeating this cycle one or more times and then sintering the composite. The inorganic fiber bundles may be prepared by impregnating a plurality of inorganic fiber bundles oriented in one direction with inorganic compound precursor and then heating the impregnated bundles. The orientation of the resultant inorganic fiber bundles in one or two directions may be accomplished by forming matrix components into a green sheet, disposing fiber bundles in a uniformly parallel alignment in one direction on the green sheet, stacking a plurality of the sheets with the directions of the fiber bundles in the sheets being all the same or with the direction of one sheet being crossing with those of adjacent layers. When the matrix is metal, a similar composite structure may be achieved by preparing a metal sheet having desired component for the matrix, disposing fiber bundles on the sheet, stacking a plurality of the sheets similarly, heating the laminate to fuse, and cooling the fused laminate to solidify. Alternatively, the composite structures may be produced by impregnating a preform of fiber bundles with a slurry or molten metal of the desired component for the matrix. When relatively short fiber bundles are used, the fiber bundles may be mixed with a slurry or molten metal of matrix component and then extruded into a shape to produce a composite structure having desired orientation of fibers.

The continuous fibers to be used in the present invention include SiC, C, $Si_3N_4$, B, B (with W core), SiC (with W core), and $Al_2O_3$ fibers which can be used alone or in combination. The continuous fibers should have desirably a diameter of 10 μm to 2000 μm. The content of continuous fibers should be preferably in the range of 3 to 60% by volume. A higher content does not contribute to improvement in toughness, while a lower content may result in a reduction in strength. The continuous fibers are oriented at least one direction in matrix. Moreover, in order to prevent the reaction between the continuous fibers and the matrix, the fibers may be coated on the surfaces thereof with at least one of SiC, C, TiC, $B_4C$, BN, TiN, $Si_3N_4$, AlN, $SiO_2$, $TiO_2$, $ZrO_2$, $Al_2O_3$, ZnO, MgO, $B_2O_3$, and $Ta_2O_6$. The inorganic fiber bundles should desirably be free of fault which may be produced from reactions with ceramic matrix component. The reactions between the inorganic fiber bundles and the ceramic matrix can be avoided by provision of a non-reactive intermediate layer as by coating and the like. This intermediate layer may effect relaxation of the residual stresses caused by the difference in thermal expansion coefficient between the ceramic matrix and the inorganic fiber bundles as well as prevention of the reactions therebetween.

Moreover, the present inventors have made an intensive research to develop a process for producing a continuous inorganic fiber bundle reinforced composite material having a composite structure where particles are distributed in grains and at grain boundaries of the ceramic matrix, the particles being spherical, quasi-spherical, acicular, whisker, cylindrical, or plate crystals, and as a result, discovered an in situ precipitation process comprising causing reaction with starting materials in the course of sintering to precipitate the particles distributed. This process enables the production of a composite ceramic having a composite structure where particles are distributed in grains and at interfacial boundaries of the ceramic matrix with the composition of the ceramic matrix being overall different from those of the starting materials.

The precipitation of particles in the composite structure by reaction of starting materials according to the present invention allows 30% or more of directly bonded texture to be produced relative to the overall grains in the matrix with reduced amounts of glassy or alloy phases at grain boundaries, thereby providing a composite materials having an excellent strength property at high temperatures. Oxide films existing on the surfaces of starting materials are unavoidable substances and not included in the calculation of the aforementioned 30%. The precipitation of inorganic particles using a gas such as nitrogen in the precipitation reaction is accompanied by an expansion in volume so that densification can be achieved without any contraction. Thus the present invention allows the glass or alloy phases to comprise less than 3% by volume which serve for bonding the ceramic matrix in the fiber reinforced ceramics.

The precipitation process of the present invention provides also a higher density sintered body by inclusion of sintering aid. In this case, there is produced a structure containing 3 to 20% by volume of glass or alloy phases for bonding the ceramic matrix. The densification with aids can be performed after the precipitation reaction was completed.

On the other hand, a fiber reinforced composite material produced by the process of the present invention to achieve the aforementioned objects comprises a ceramic matrix composed of at least one selected from the group consisting of nitrides, carbides, oxides, carbonitrides, oxynitrides, and borides of Si, Al, Cr, Ti, Zr, Mg, B, and Y, and the particles distributed in or at grains and interfacial boundaries in the ceramic matrix composed of at least one selected from the group consisting of nitrides, carbides, oxides, carbonitrides, oxynitrides, borides, intermetallic compounds of Si, Al, Cr, Ti, Zr, Mg, B, Y, W, Nb, V, Sc, La, Hf, Mo, Ce, Yb, Er, Ho, and Dy, the particles having a different composition from that of the matrix. The ceramic matrix can be produced by preparing a metallic powder of at least one selected from the group consisting of Si, Al, Cr, Ti, Zr, Mg, B, Y, W, Nb, V, Sc, La, Hf, Mo, Ce, Yb, Er, Ho, and Dy, or a mix powder of the metallic powder with a ceramic powder of at least one selected from the group consisting of nitrides, carbides, oxides, carbonitrides, oxynitrides, borides, and intermetallic compounds of Si, Al, Cr, Ti, Zr, Mg, B, Y, W, Nb, V, Sc, La, Hf, Mo, Ce, Yb, Er, Ho, and Dy, forming the metallic powder or the mixed powder into a shape and heating the shape in a reactive atmosphere of at least one selected from the group consisting of nitriding, carbiding, carbonitriding, oxidating, oxynitriding, and inert gases to effect in situ precipitation.

Specifically the matrix should be made of at least one selected from the group consisting of SiC, TiC, ZrC, $Si_3N_4$, AlN, TiN, BN, ZrN, $ZrB_2$, $TiB_2$, $CrB_2$, $Al_2O_3$, MgO, mullite, and $ZrO_2$. The metal should be at least one selected from the group consisting of Al, Cu, Ti, Mg, Al based alloy, Cu based alloy, Cr based alloy, Ni based alloy, TiAl alloy, NbAl alloy, NiAl alloy, MoAl alloy, ZrAl alloy, TiSi alloy, and stainless steel.

The content of particles distributed in the matrix in the present invention should be preferably 5 to 30% by volume. In the case of metal, the particles may be distributed by a dispersion process in molten metal, or by a mechanical alloying process.

Moreover, a process for producing a fiber reinforced composite material of the present invention comprise forming a ceramic material comprising at least one selected from the group consisting of nitrides, carbides, oxides, carbonitrides, oxynitrides, and borides of Si, Al, Cr, Ti, Zr, Mg, B, and Y, into a green sheet, disposing inorganic fiber bundles on the green sheet, and repeating this cycle one or more times, and subjecting the composite to a precipitation reaction. The bonding of inorganic fibers into a bundle may be accomplished by impregnating a bundle of a plurality of continuous inorganic fibers parallelly aligned in one direction with a precursor of inorganic compound, and then heating the impregnated bundle to a temperature, at which the precursor is converted into ceramic. A composite having inorganic fiber bundles aligned in one direction or two directions in a matrix may be produced by forming a matrix material as described above into a green sheet, disposing inorganic fiber bundles parallelly aligned in one direction on the green sheet, repeating this cycle one or more times to stack two or more inorganic fiber bundle containing green sheets with all the directions of bundles being the same, or the direction of the bundles in one sheet crossing that in adjacent sheets. Alternatively, it may be produced by preparing a preform containing inorganic fiber bundles and then impregnating the preform with a slurry of the matrix material as described above.

The produced composites are required to be chemically stable in the environment, in which they are used. Although there is a possibility that the matrix and the inorganic fibers may oxidatively be attacked depending upon their composition, especially in air at high temperatures, this can be prevented by precoating the surfaces of the composite material with a heat-resistant oxide ceramic.

The present invention enables a diminution of the residual stress due to a difference in thermal expansion coefficient between the fiber bundles and the matrix as well as an increase in strength of the composite materials, thus a greater energy being required for destraction thereof. The sintering of the starting materials through reaction allows distribution of particles of optional shapes in grains and at grain boundaries of the ceramic matrix, the particles having a different composition from those of the ceramic matrix and grains, so that the strength and toughness of the matrix can be enhanced. The precipitation reaction allows the production of finer particles independently to the particle size of starting materials and no need of using short fibers as starting material which can eliminate environmental problems. The texture where the direct bonding between grains comprises 30% or more of the volume of bondings between grains makes the produced fiber reinforced composite materials excellent in characteristics (strength and creep property) at high temperatures. The precipitation reaction for converting the ceramic matrix into the composite material affords a suitable process for producing complicated shapes with less construction upon sintering, which process requires little processing to produce articles with smaller residual stress due to processing. Thus ceramic parts produced with the composite material s according to the present invention have a higher reliability and wide applicability in mechanical parts such as gas turbines, internal combustion engines, nuclear fusion furnaces, aircrafts, space craft appliances, plants and engines, especially gas turbine parts, internal combustion engine parts, nuclear fusion furnace parts, slide members, heat-resistant members, and structural members.

The present invention will be described practically with reference to the following examples.

EXAMPLE 1

First, a process for producing a bundle of carbon fibers (referred to as C fibers, and generally "carbon" is abbreviated "C" hereinunder) is described. Several continuous carbon fibers of pitch type were oriented in a parallel arrangement with each other, impregnated with a solution of a ratio by weight of phenolic resin to ethanol of 1:1, and heated in a vacuum at 2000° C. for one hour to solidify the phenolic resin to produce a C fiber bundle with C medium. In this case the number of C fiber bundles used may be varied to alter the diameter of the C fiber bundles. The content of C medium in the fiber bundles obtained in this process was about 60% by volume independently of the diameter of the fiber bundles.

Figure 20B:
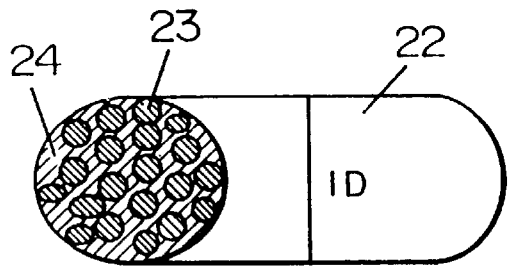
FIG. 20B is an enlarged schematic cross-sectional view of the bundle.
Figure 20C:
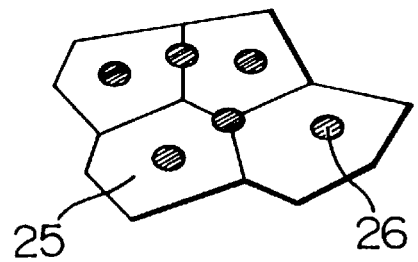
FIG. 20C is an enlarged schematic cross-sectional view of the matrix.
Figure 20A:
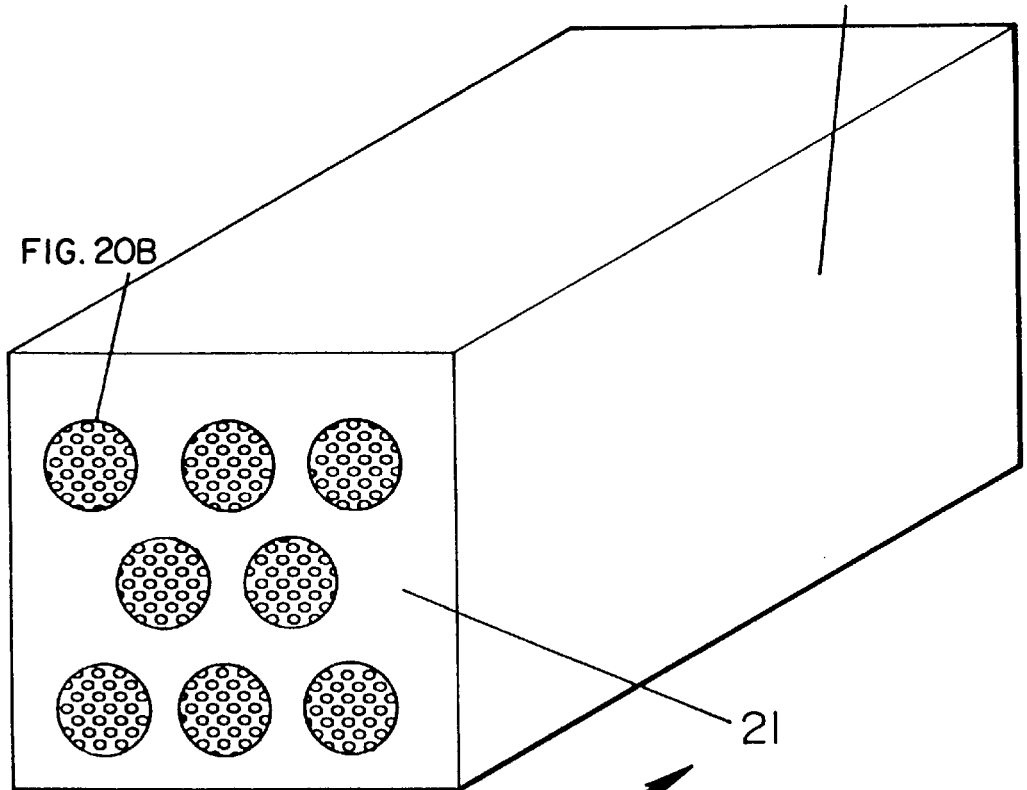
FIG. 20A is a schematic perspective view of a precipitated composite ceramic matrix-C fiber bundle reinforced composite material.

Next, a process for producing a composite material is described. 80 parts by weight of a Si powder having an average particle size of 0.5 μm, 20 parts by weight of $MoSi_2$ having an average particle size 0.5 μm were mixed in a predetermined amount of an organic solvent to produce a slurry which was formed into a green sheet by a doctor blade method. The C fiber bundles produced above were oriented in one direction as uniformly on the dried green sheet as possible. Several green sheets with oriented C fiber bundles were stacked with all the fiber bundles in the laminate being oriented in the same direction and pressed at 98 MPa in the direction of the sheet stacking to form a shape. The resulting shape was heated to a temperature of 1500° C. in an atmosphere of nitrogen to cause the following precipitation reactions:

$$3Si+2N_2 \rightarrow Si_3N_4$$

$$3/2Mo+3Si+2N_2 \rightarrow Si_3N_4+3/2Mo$$

which precipitated nano-sized Mo particles in micron-sized $Si_3N_4$ grains and at grain boundaries thereof in the $Si_3N_4$ matrix, thereby producing a C fiber bundle reinforced composite material comprising the $Si_3N_4$ matrix having Mo particles distributed therein. The rate of contraction upon sintering was 0.2%. The resultant sintered bodies are shown schematically in FIGS. 20A, 20B and 20C. FIG. 20A is a schematic view of a structure where the fiber bundles are embedded in the composite ceramic 21 subjected to the precipitation reaction. FIG. 20B is an enlarged schematic view of the fiber bundle 22 which has a diameter D and comprises long fibers 23 in fiber binder 24. FIG. 20C is an enlarged schematic view of the matrix containing Mo particles in $Si_3N_4$ grains and at grain boundaries thereof.

In the process, the nitriding reaction may be promoted by mixing a reducing gas such as hydrogen gas.

The same process as described above were repeated to produce C fiber bundle reinforced composite materials, except that the $MoSi_2$ powder was replaced by at least one selected from the group consisting of powdery silicides of Ti, Zr, W, Hf, Al, V, Nb, Ta, and Cr. As a result, there could be produced various C fiber bundle reinforced composite materials comprising a $Si_3N_4$ matrix having nano-sized particles of TiN, ZrN, W, WN, HfN, AlN, VN, NbN, TaN, or CrN precipitated in micron sized $Si_3N_4$ grains and at grain boundaries thereof.

The same process as described above were repeated to produce C fiber bundle reinforced composite materials, except that the $MoSi_2$ powder was replaced by at least one selected from the group consisting of powdery carbide of Ti, Zr, B, Mo, W, Hf, Al, V, Nb, Ta, and Cr, or by at least one selected from the group consisting of powdery borides of Ti, Zr, B, Mo, W, Hf, Al, V, Nb, Ta, and Cr. As a result, there could be produced various C fiber bundle reinforced composite materials comprising a $Si_3N_4$ matrix having nano-sized particles of TiN, ZrN, BN, Mo, W, WN, HfN, AlN, VN, NbN, TaN, CrN, or SiC precipitated in micron sized $Si_3N_4$ grains and at grain boundaries thereof.

EXAMPLE 2

A process for producing a composite material is described. 80 parts by weight of a Si powder having an average particle size of 0.5 μm, 20 parts by weight of TiC having an average particle size or 0.5 μm were mixed in a predetermined amount of an organic solvent to produce a slurry which was formed into a green sheet by a doctor blade method. SiC fibers having a diameter of 100 μm were oriented in one direction as uniformly on the dried green sheet as possible. Several green sheets with oriented SiC fibers were stacked with all the fibers in the laminate being oriented in the same direction and pressed at 98 MPa in the direction of the sheet stacking to form a shape. The content of the oriented SiC fibers in the matrix was 20% by volume. The resulting shape was heated to a temperature of 1600° C. in an atmosphere of nitrogen to cause the following precipitation reactions:

$$3Si+2N_2 \rightarrow Si_3N_4$$

$$TiC+\tfrac{1}{2}N \rightarrow TiN+C$$

$$Si+C \rightarrow SiC$$

which precipitated nano-sized TiN and SiC particles in micron-sized $Si_3N_4$ grains and at grain boundaries thereof in the $Si_3N_4$ matrix as well as micron-sized SiC particles having an aspect ratio of 3 to 7. The rate of contraction upon sintering was 0.3%. Substantially all the grains in the sintered body were bonded directly to one another with only 2% or less glassy layer being present at boundaries. This process produced a SiC fiber reinforced $Si_3N_4$ ceramic having a flexure strength of 610 MPa, fracture toughness of 15 MPa·m$^{1/2}$ and a porosity of 15%. The composite materials produced through the precipitation reaction undergo little contraction upon sintering so that they are particularly suitable for production of particles having complicated shapes without requiring substantial post-processing, thereby resulting in reduced residual stress due to the processing.

By replacing the Si powder by a powder of at least one selected from the group consisting of Al, Cr, Ti, Zr, Mg, B, Y, W, Nb, V, Sc, La, Hf, Mo, Ce, Yb, Er, and Dy, there can be precipitated similarly upon sintering particles of at least one selected from the group consisting of nitrides, carbides, oxides, carbonitrides, oxynitrides, borides, and intermetallic compounds of Ti, Zr, W, Hf, Al, V, Nb, Ta, and Cr.

Similarly by replacing the Si powder by a $SiO_2$ and heating to 1600° C. in an atmosphere of a gaseous mixture of nitrogen and hydrogen, there can be produced composite materials comprising a $Si_3N_4$ matrix having nano-sized TiN and SiC particles in micron-sized $Si_3N_4$ grains and at grain boundaries thereof as well as micron-sized SiC particles having an aspect ratio of 3 to 7. With other metal oxides a nitriding treatment and reduction can cause complex precipitation reaction in sintering.

Table 11 summarizes the compositions of sintered bodies obtained through the precipitation reaction using starting materials for composing matrix. According to the present invention, one can precipitate desired particles through the precipitation reaction in sintering.

EXAMPLE 3

80 parts by weight of a Si powder having an average particle size of 0.5 μm, 20 parts by weight of TiC having an average particle size or 0.5 μm were mixed with 2 parts by weight of each of sintering aids $Y_2O_3$ and $Al_2O_3$ for densification in a predetermined amount of an organic solvent to produce a slurry which was formed into a green sheet by a doctor blade method. Long SiC fibers having a diameter of 100 μm were oriented parallelly in one direction as uniformly on the dried green sheet as possible. Several green sheets with oriented SiC fibers were stacked with all the fibers in the laminate being oriented in the same direction and pressed at 98 MPa in the direction of the sheet stacking to form a shape. The content of the oriented SiC fibers in the matrix was 20% by volume. The resulting shape was heated to a temperature of 1600° C. in an atmosphere of nitrogen to cause the following precipitation reactions:

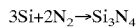

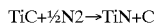

and then subjected to heat-treatment at 1750° C. for five hours for densification, which precipitated nano-sized TiN and SiC particles in micron-sized $Si_3N_4$ grains and at grain boundaries thereof in the $Si_3N_4$ matrix as well as micron-sized SiC particles having an aspect ratio of 3 to 7. The rate of contraction upon this sintering was 4.2%. The resulting sintered body had 82% of direct bonding and the remaining 18% of an alloy phase comprising the sintering aids based on the overall bondings between grains in the sintered body. This process produced a SiC fiber reinforced $Si_3N_4$ ceramic having a flexure strength of 1560 MPa, fracture toughness of 27 MPa·m$^{1/2}$ and a porosity of 0.5%.

The sintering aids which may be used for the densification of the $Si_3N_4$ composite to be sintered include oxides of Zr, Si, Yb, Er, Hf and rare earth metals other than $Y_2O_3$ and $Al_2O_3$. The type of sintering aid to be used varies depending upon the composition of matrix, and commonly known aids can be used. In the case of SiC, for example, B, C and $Al_2O_3$ can be used.

By replacing the Si powder by a powder of at least one selected from the group consisting of Al, Cr, Ti, Zr, Mg, B, Y, W, Nb, V, Sc, La, Hf, Mo, Ce, Yb, Er, Ho, and Dy, there can be precipitated similarly upon sintering particles of at least one selected from the group consisting of nitrides, carbides, oxides, carbonitrides, oxynitrides, borides, and intermetallic compounds.

EXAMPLE 4

This Example 4 describes several illustrative examples of production of inorganic fiber bundles in accordance with the present invention.

Figure 12:
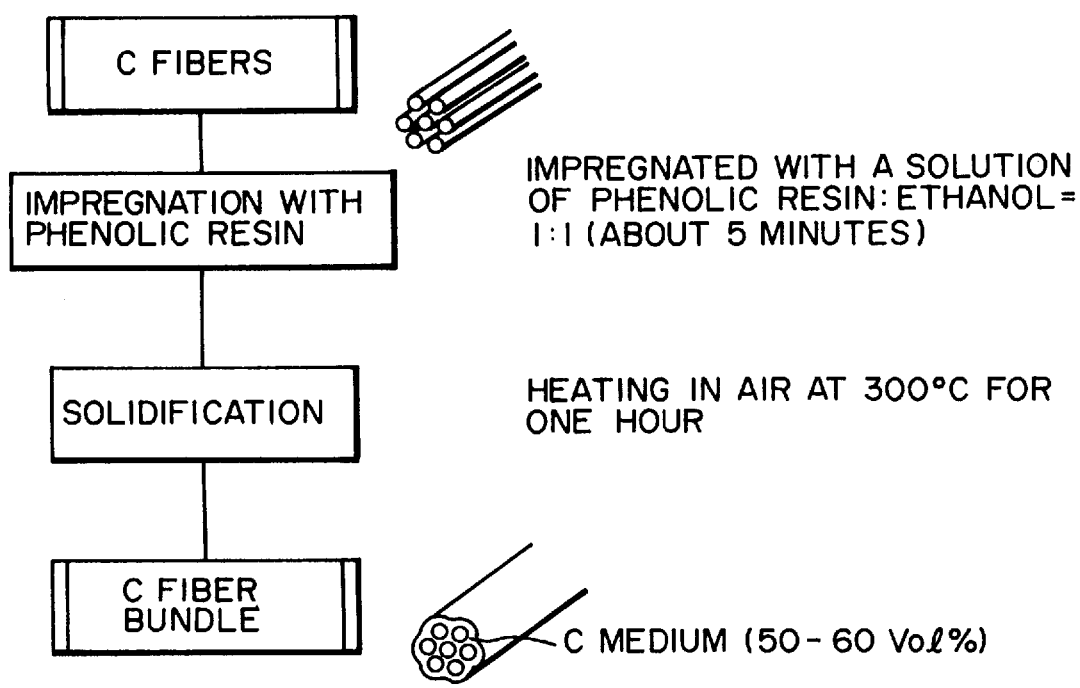
FIG. 12 shows a block diagram with some diagrammatical perspective views depicting a process for forming a carbon fiber bundle.

First, a process for producing a C fiber bundle with C medium is described. FIG. 12 shows schematically the steps of the process. At least one thousand continuous carbon fibers of pitch type were oriented in a parallel arrangement with each other, impregnated with a solution of a ratio by weight of phenolic resin to ethanol of 1:1, and heated in air at 300° C. for one hour to solidify the phenolic resin to produce a C fiber bundle with C medium. In this case the number of C fiber bundles to be used may be varied to alter the diameter of the C fiber bundles. In this example, the number of C fibers was 1000 to 4800 per bundle. The content of C medium in the fiber bundles obtained in this process was about 50 to 60% by volume. The C fibers to be used for accomplishing the similar production include PAN (polyacrylonitrile) and cellulose types of fibers.

Next, aside from the process as described above, another process for producing a C fiber bundle with C medium is described. In this case polyvinyl alcohol was used as a precursor of C medium. At least one thousand continuous C fibers of pitch type were oriented parallelly in one direction, impregnated with a solution of a mixture of polyvinyl alcohol and warm water of a weight ratio of 1:1, dried by heating in air at 80° C. for 2 to 3 hours, and then heated at 300° C. for one hour to solidify the polyvinyl alcohol to produce a C fiber bundle with C medium. The content of C medium in the fiber bundles obtained in this process was 20 to 30% by volume independently of the diameter of fiber bundles. In the two processes as described above, the heating temperatures were 300° C. resulting in insufficient carbiding of the precursor. However, sufficient carbiding could be achieved in the course of heating and sintering in the production of composite materials. The content of medium may be controlled by varying the concentration of a solution of precursor and the number of impregnation cycles.

Next, a process for producing a C fiber bundle with SiC medium is described. At least one thousand continuous C fibers of pitch type were oriented parallelly in one direction, impregnated with polycarbosilane, and then heated at 350° C. in air for one hour to convert the polycarbosilane into a carbide to produce a C fiber bundle with SiC medium. The heating at a temperature of 350° C. resulted in insufficient thermal decomposition of the polycarbosilane to be converted into complete SiC. However, the conversion into SiC could be achieved in the course of heating and sintering in the production of composite materials. The content of SiC medium in the fiber bundles obtained in this process was about 50% by volume independently of the diameter of fiber bundles. The content of medium may be controlled by varying the concentration of a solution of precursor and the number of impregnation cycles.

Next, a process for producing a C fiber bundle with TiC—SiC medium is described. At least one thousand continuous C fibers of pitch type were oriented parallelly in one direction, impregnated with polytitanocarbosilane, and then heated in a vacuum at 1400° C. for one hour to produce a C fiber bundle with the TiC—SiC medium. The content of TiC—SiC medium in the fiber bundles obtained in this process was about 30% by volume independently of the diameter of fiber bundles. Moreover, a process for producing an $Al_2O_3$ fiber bundle with $B_2O_3$ medium is described. At least one thousand continuous $Al_2O_3$ fibers were oriented parallelly in one direction, immersed in a boron alkoxide expressed by the formula $B(O-nC_4H_9)_3$, reacted with water in alcohol, and then heat-treated at 100° C. for 10 hours to produce a $Al_2O_3$ fiber bundle with the $B_2O_3$ medium. The content of $B_2O_3$ medium in the fiber bundles obtained in this process was about 10% by volume independently of the diameter of fiber bundles. The content of medium may be controlled by varying the number of immersion and heat-treatment cycles.

In the same procedure, by impregnating with at least one selected from the group consisting of precursors of $B_4C$, BN, $Si_3N_4$, $SiO_2$, $TiO_2$, $Al_2O_3$ and $Ta_2O_5$, one can produce inorganic fiber bundles comprising inorganic fibers other than C fibers with the medium derived from the selected at least one precursor, i.e., bundles of SiC, B, B (W core), SiC (W core), SiC (C core), or $Al_2O_3$ fibers. With respect to combinations of fibers and medium, a combination of a non-oxide and an oxide may possibly cause the deterioration in characteristics of fiber bundles due to a great reaction between the fibers and the medium when heated to high temperatures in the subsequent sintering and the like process for forming composites, though the production of fiber bundles is possible. Therefore, combinations of a non-oxide and a non-oxide, or an oxide and an oxide are preferred. Alternatively, the reactions can be prevented to some extent by precoating less reactive material, such as BN on the surfaces of the fibers.

Fiber bundles containing two types of fibers can be similarly produced. The production of fiber bundles may be accomplished by impregnating the fibers with a slurry of medium components or by impregnation in chemical vapor phase, other than impregnation with precursors and then heating as described above.

Representative examples of combinations of inorganic fiber bundles and medium other than those made in this example as described above are listed in Table 1.

TABLE 1

| Inorganic fibers | Medium | Inorganic fibers | Medium |
|---|---|---|---|
| C | C—$B_4C$ | SiC (W core) | C |
| SiC | C | | SiC |
| | SiC | SiC (W core) | C |
| | TiC—SiC | | SiC |
| | C—$B_4C$ | | C—$B_4C$ |
| $Si_3N_4$ | C | $Al_2O_3$ | $SiO_2$ |

TABLE 1-continued

| Inorganic fibers | Medium | Inorganic fibers | Medium |
|---|---|---|---|
| | SiC | | $TiO_2$ |
| | $Si_3N_4$ | | $Al_2O_3$ |
| | BN | | $Ta_2O_5$ |
| B | BN | | |
| | $B_4C$ | | |
| B (W core) | BN | | |
| | $Si_3N_4$ | | |

EXAMPLE 5

This Example 5 illustrates a process for producing a fiber bundle reinforced composite material with a ceramic matrix using the inorganic fiber bundles made in Example 4.

Figure 13:
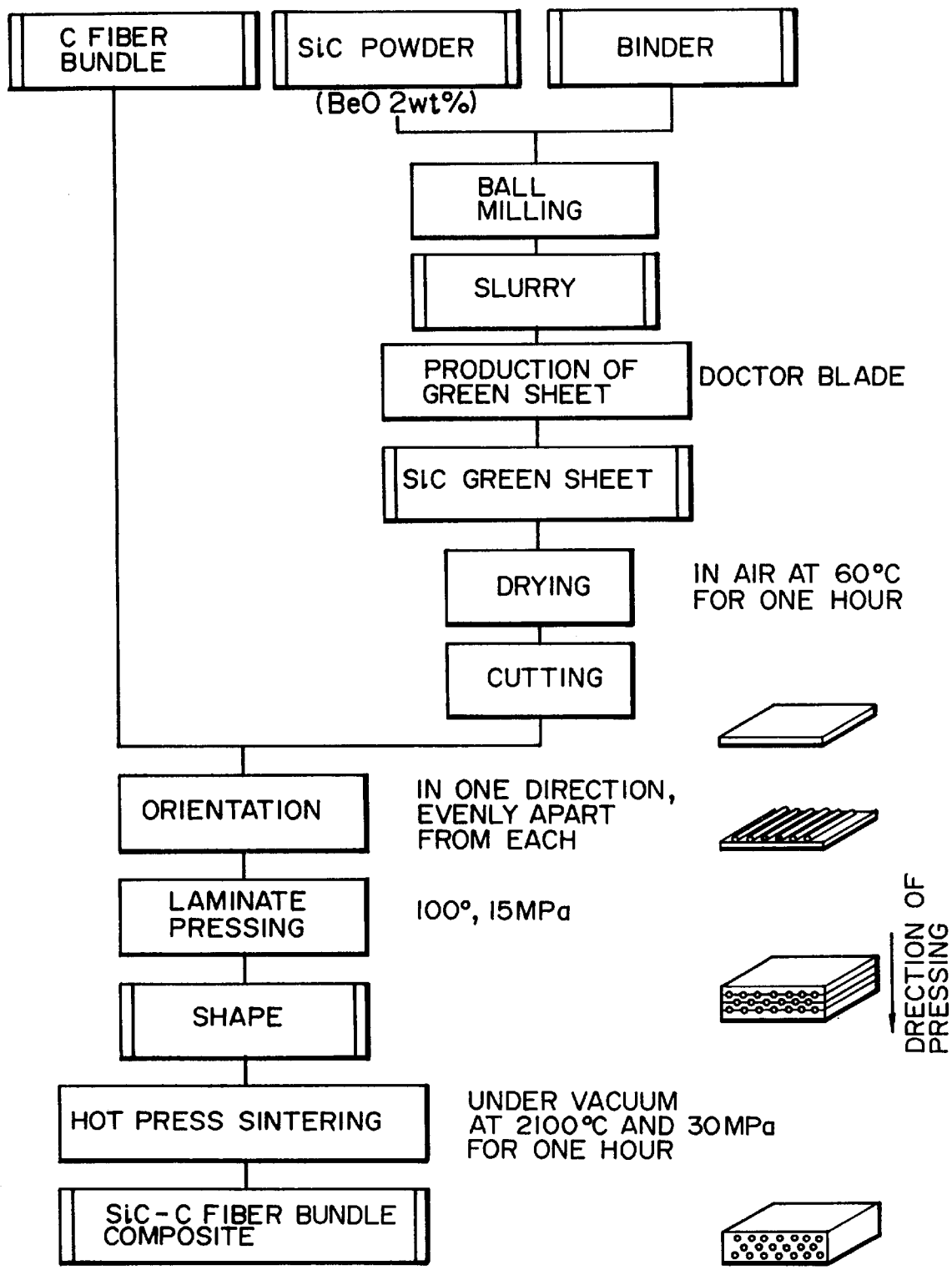
FIG. 13 is a block diagram with some diagrammatical perspective views depicting a process for producing a SiC matrix-C fiber bundle reinforced composite material.

First, a process for producing a SiC—C fiber bundle composite material comprising a SiC ceramic matrix reinforced in one direction with C fiber bundles is described. The medium for the C fiber bundles is carbon. FIG. 13 shows diagrammatically steps of the production of the SiC—C fiber bundle reinforced composite material.

A SiC powder which has been previously dry-mixed with 2% by weight of a BeO powder as sintering aid was mixed in a predetermined amount of organic solvent (binder) to produce a slurry which was formed into a green sheet by a doctor blade method. The above C fiber bundles were disposed in a parallel arrangement to one another as uniformly on the dried green sheet as possible. Several green sheets with oriented C fiber bundles were stacked with all the fibers in the laminate being oriented in the same direction and pressed at 15 MPa in the direction of the sheet stacking in air at 100° C. for one minute to form a shape. The resultant shape was sintered by hot-pressing at a pressure of 30 MPa in the direction of the sheet stacking in a vacuum under heat at 2100° C. for one hour to produce a SiC—C fiber bundle composite material. The relationship between the content of C fiber bundles in the composite material produced and the diameter is as shown in FIG. 3 referred to previously.

Next, a process for producing a $Si_3N_4$—C fiber bundle composite material comprising a $Si_3N_4$ ceramic matrix reinforced in one direction with C fiber bundles is described. The medium for the C fiber bundles is SiC. A Si powder and a SiC powder were mixed in a weight ratio of 2:3 and to the resulting mixture were added pure water and a predetermined amount of binder, and the whole was mixed on a pot mill for 24 hours to produce a slurry. The slurry was cast into a water sorptive gypsum mold, in which the C fiber bundles had been previously disposed in a parallel arrangement to one another and fixed, and dried to produce a shape. The resultant shape was sintered at a pressure of 0.88 MPa in a gaseous atmosphere of nitrogen under heat, and left in the furnace to cool. The heating temperature and the retention time were varied multi-step wise in a manner as at 1100° C. for 10 hours, at 1200° C. for 20 hours, at 1300° C. for 10 hours, and at 1350° C. for 5 hours to control the conversion of metal Si into $Si_3N_4$. This process could yield a $Si_3N_4$—C fiber bundle composite material where the C fiber bundles were oriented in one direction. The relationship between the content of C fiber bundles and the diameter thereof in the composite material produced is as shown in FIG. 3 referred to previously.

Next, a process for producing a $ZrB_2$—C fiber bundle composite material comprising a $ZrB_2$ ceramic matrix reinforced in one direction with C fiber bundles is described. The medium for the C fiber bundles is SiC. To a ZrB$_2$ powder was added a predetermined amount of binder to produce a slurry which was formed into a green sheet by a doctor blade method. The above C fiber bundles were disposed in a parallel arrangement to one another as uniformly on the dried green sheet as possible. Several green sheets with oriented C fiber bundles were stacked with all the fibers in the laminate being oriented in the same direction and pressed at 15 MPa in the direction of the sheet stacking in air at 100° C. for one minute to form a shape. The resultant shape was sintered by hot-pressing at a pressure of 30 MPa in the direction of the sheet stacking in a vacuum under heat at 1900° C. for one hour to produce a ZrB$_2$—C fiber bundle composite material. The relationship between the content of C fiber bundles and the diameter thereof in the composite material produced is as shown in FIG. 5 referred to previously.

Next, a process for producing a MgO—Al$_2$O$_3$ fiber bundle composite material comprising a MgO ceramic matrix reinforced in one direction with Al$_2$O$_3$ fiber bundles is described. The medium for the Al$_2$O$_3$ fiber bundles is B$_2$O$_3$. To a MgO powder was added a predetermined amount of binder to produce a slurry which was formed into a green sheet by a doctor blade method. The above Al$_2$O$_3$ fiber bundles were disposed in an orientation in one direction as uniformly on the dried green sheet as possible. Several green sheets with oriented Al$_2$O$_3$ fiber bundles were stacked with all the fibers in the laminate being oriented in the same direction and pressed at 20 MPa in the direction of the sheet stacking in air at 100° C. for 5 minutes to form a shape. The resultant shape was sintered by hot-pressing at a pressure of 30 MPa in the direction of the sheet stacking in air under heat at 1250° C. for one hour to produce a MgO—Al$_2$O$_3$ fiber bundle composite material. The relationship between the content of Al$_2$O$_3$ fiber bundles and the diameter thereof in the composite material produced is as shown in FIG. 6 referred to previously. In any one of the processes as described above, the content of fiber bundles can be controlled by the thickness of the green sheet of matrix component and the distance between the fiber bundles oriented.

An attempt has been made to produce several types of fiber bundle reinforced composite material using matrixes of different components and fiber bundles of different components according to the identical processes as described above. As a result, in any case, composite materials with fiber bundles being oriented in one direction could be easily produced. Since there may occur any reaction between the matrix and the fiber bundles depending upon the components thereof resulting in deterioration in characteristics of the fiber bundles, the combination of the matrix and the fiber bundles should be preferably an oxide and an oxide, or a non-oxide and a non-oxide. Alternatively, the reaction can be suppressed by precoating the surfaces of the fiber bundles with materials as illustrated in Examples.

When the fiber bundles to be used are relatively short, the fiber bundles may be mixed with a slurry of matrix component and extruded by an extruder equipped with a lattice type die to form shapes which are sintered to produce composite materials with the fiber bundles being oriented in one direction.

It is substantiated from the foregoing that the use of fiber bundles allows the production of the composite materials with fiber bundles being oriented in one direction in ceramic matrix. Representative combinations of matrixes for composite materials and fiber bundles other than those made in the examples as described above are listed in Table 2. The results of evaluation of those composites for three point probe flexure strength and the fracture toughness of those composite materials are also summarized in Table 2.

TABLE 2

| Matrix | Fiber bundles (Medium) | Three point flexure strength (MPa) | Fracture toughness K$_{IC}$ (MPa · m$^{1/2}$) |
|---|---|---|---|
| SiC | SiC (C) | 500 | 9.5 |
| TiC | SiC (SiC) | 520 | 8.2 |
| ZrC | SiC(C core)(SiC) | 150 | 4.5 |
| B$_4$C | C (C.B$_4$C) | 270 | 4.0 |
| Si$_3$N$_4$ | S (SiC) | 800 | 7.0 |
| Si$_3$N$_4$ | SiC (SiC) | 850 | 8.5 |
| AlN | Si$_3$N$_4$ (SiC) | 250 | 4.5 |
| TiN | B (BN) | 230 | 6.0 |
| BN | C (C.B$_4$C) | 110 | 5.5 |
| ZrN | Si$_3$N$_4$ (SiC) | 170 | 4.3 |
| ZrB$_2$ | C (SiC) | 330 | 6.5 |
| ZrB$_2$ | SiC (SiC) | 345 | 8.0 |
| TiB$_2$ | B (W core)(BN) | 250 | 4.7 |
| CrB$_2$ | SiC (SiC) | 200 | 4.0 |
| Al$_2$O$_3$ | Al$_2$O$_3$ (B$_2$O$_3$) | 310 | 7.5 |
| MgO | Al$_2$O$_3$ (B$_2$O$_3$) | 240 | 5.0 |
| MgO | Al$_2$O$_3$ (SiO$_2$) | 255 | 5.5 |
| Mullite | Al$_2$O$_3$ (SiO$_2$) | 380 | 7.3 |
| ZrO$_2$ | Al$_2$O$_3$ (Ta$_2$O$_5$) | 900 | 13.5 |

EXAMPLE 6

This Example 6 illustrates a process for producing a fiber bundle reinforced composite material with a metal matrix using the inorganic fiber bundles made in Example 4.

First, a process for producing a Cu—C fiber bundle composite material comprising a Cu matrix reinforced in one direction with C fiber bundles is described. The medium for the C fiber bundles is carbon. The C fiber bundles were disposed in a parallel arrangement to one another as uniformly on a Cu plate as possible. Several plates with oriented C fiber bundles were stacked with all the fibers in the laminate being oriented in the same direction and heated in a die to 900° C. under vacuum to be fuse-softened. Copper does not wet the C fiber bundles, and hence the surfaces of the C fiber bundles should be preplated with copper, and in addition pressing in the plate stacking direction should be effected, which enhance the adhesiveness between the Cu and the C fiber bundles. After the heating, the laminate could be cooled and solidified to produce a Cu—C fiber bundle composite material. The relationship between the content of C fiber bundles and the diameter thereof in the composite material produced is as shown in FIG. 8 referred to previously.

Next, a process for producing a Ti—SiC fiber bundle composite material comprising a Ti matrix reinforced in one direction with SiC fiber bundles is described. The medium for the SiC fiber bundles is TiC.SiC. The SiC fiber bundles were disposed in a parallel arrangement to one another as uniformly on a Ti plate as possible. Several plates with oriented SiC fiber bundles were stacked with all the fibers in the laminate being oriented in the same direction and heated in a die to 1600° C. under vacuum to be fuse-softened. The surfaces of Ti are highly active and prone to oxidizing so that the aforementioned processes must be performed under anti-oxidation means such as inert atmosphere. In this case, pressing in the plate stacking direction enhances the adhesiveness between the Ti and the SiC fiber bundles. After the heating, the laminate could be cooled and solidified to produce a Cu—C fiber bundle composite material. The relationship between the content of C fiber bundles and the diameter thereof in the composite material produced is as shown in FIG. 9 referred to previously.

According to the identical process to those described above, an attempt has been made to produce several types of fiber bundle reinforced composite material using matrixes of different components such as pure metals, alloys or intermetallic compounds and fiber bundles of different components. As a result, in any case, composite materials with fiber bundles being oriented in one direction could be easily produced. Since there may occur any reaction between the matrix and the fiber bundles depending upon the components thereof resulting in deterioration in characteristics of the fiber bundles, the surfaces of the fiber bundles should desirably be precoated with materials as illustrated in Examples.

When the fiber bundles to be used are relatively short, the fiber bundles may be mixed with a molten metal of matrix component and extruded by an extruder equipped with a lattice type die into a mold to form shapes which are cooled and solidified to produce composite materials with the fiber bundles being oriented in one direction.

It is substantiated from the foregoing that the use of fiber bundles allows relatively easily the production of the composite materials with fiber bundles being oriented in one direction in metal matrix. Representative combinations of matrixes and fiber bundles for composite materials other than those made in the examples as described above are listed in Table 3.

TABLE 3

| Matrix | Fiber bundles (Medium) | Tensile strength (MPa) |
| --- | --- | --- |
| Al | C (C) | 200 |
| Mo | C (C.B$_4$C) | 1050 |
| Mg | Al$_2$O$_3$ (SiO$_2$) | 220 |
| Ti | SiC (TiO.SiC) | 340 |
| Al—Cu alloy | B (B$_4$C) | 200 |
| Nb$_3$Al | SiC (SiC) | 450 |
| Ti$_5$Si$_3$ | SiC (TiC.SiC) | 500 (Three point flexure) |
| Stainless steel | B (BN) | 470 |

EXAMPLE 7

The composite materials produced in Examples 5 and 6 were evaluated for mechanical properties. SiC—C fiber bundle reinforced composite materials with C fiber bundles being oriented in one direction as ceramic matrix composites were evaluated for three point probe flexure strength at room temperature and at a high temperature (under vacuum, 1500° C.). The relationship between the diameter and the flexure strength at room temperature of the fiber bundles is as shown in FIG. 7. For comparison, the results of the measurement of SiC alone for the three point probe flexure strength are also shown in FIG. 7. It can be seen from FIG. 7 that the strength of the composite materials can be enhanced with increasing the diameter of the C fiber bundles to achieve the identical strength to that of SiC alone. This is believed attributable to an enhanced relaxation of the residual stresses (tensile in SiC), which have been generated due to the difference in thermal expansion coefficient between the C fiber bundles and the SiC matrix upon sintering, owing to an increase in the amount of matrix present between the fiber bundles with enlarging the diameter of the fiber bundles. Thus, at room temperature, the controlling of the diameter and the content of fiber bundles enables an improvement in strength.

In all cases where other ceramics are used for matrix and other inorganic fiber bundles than C fiber bundles are used, the relationship between the diameter of fiber bundles and the strength of the resultant composite materials follows the same trend shown in the SiC—C fiber bundle reinforced composite materials as described above. This is also believed attributable to the larger diameter of fiber bundles which has an effect affording an enhanced relaxation of the residual tensile stresses, which have been generated due to the difference in thermal expansion coefficient between the fiber bundles and the matrix, and the smaller interfacial area between the matrix and the fiber bundles with a reduction in defects.

Figure 14:
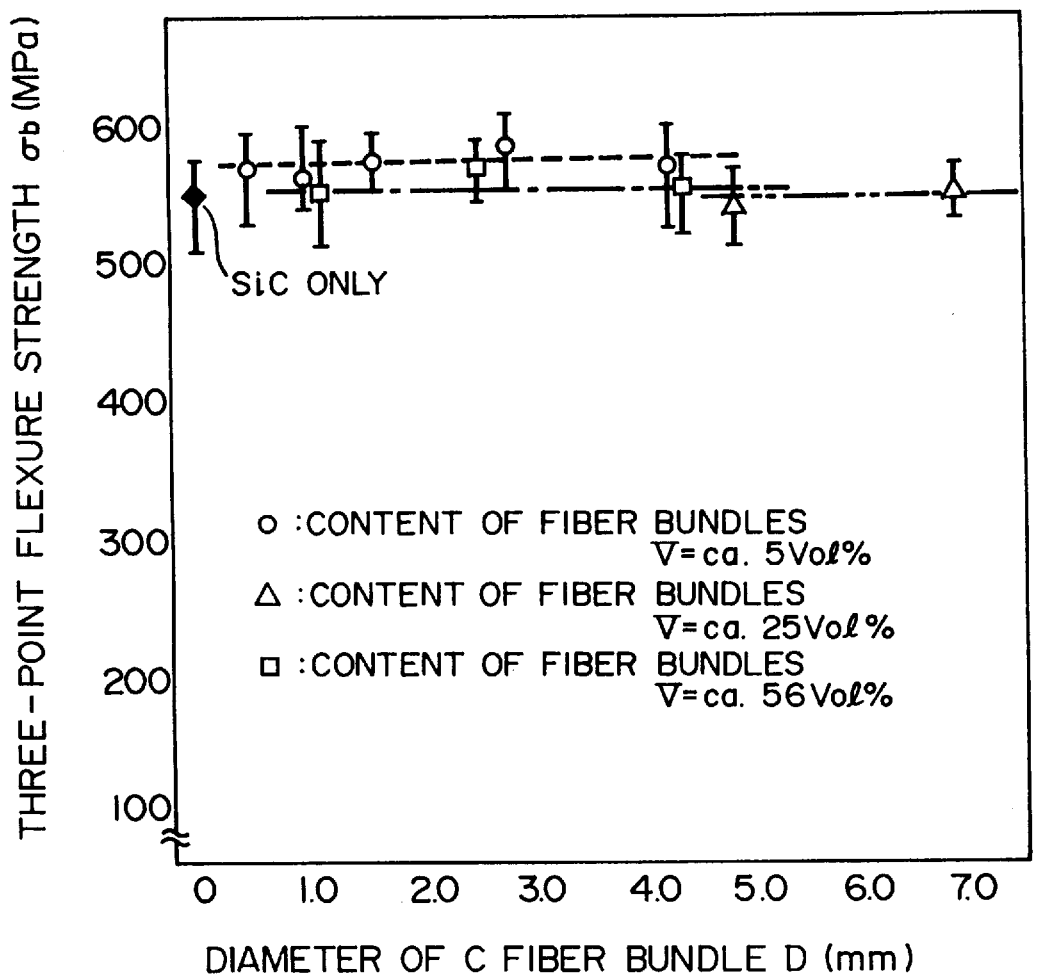
FIG. 14 is a graph showing the three point probe flexural strength at a high temperature of a SiC matrix-C fiber bundle reinforced composite material as a function of the diameter of the C bundles.

The SiC—C fiber bundle reinforced composite materials were evaluated for three point probe flexure strength at high temperature (under vacuum, 1500° C.), and the results are shown in FIG. 14. The strengths obtained at high temperatures were equal to or higher than that of SiC alone independently of the diameter of the C fiber bundles. This is considered owing to relaxation of the residual tensile stresses generated in the matrix at high temperatures, which renders the strengths at high temperatures relatively higher than that at room temperature. Thus generally the higher the temperature, the higher the strength independently of the diameter of fiber bundles indicating that those composite materials have characteristics suitable for structural materials at high temperature.

Moreover, the SiC—C fiber bundle reinforced composite materials were evaluated for fracture toughness and the results are shown in FIG. 11 as referred to previously. It can be seen from FIG. 11 that in the range of diameter as expressed by the formula (1) above, the toughness is enhanced with increasing diameter. This may be considered owing to possible occurrence of phenomena that some fiber bundles may come off the matrix with some fibers coming off the fiber bundles as well as stepwise fracture of fibers.

The aspects as described above can likewise be observed for composite materials having a ceramic matrix or fiber bundles of other components so that the composite materials comprising fiber bundles of a diameter in the range as expressed by the above formula (1) are those capable of fulfilling the objects of the present invention.

Next, Cu—C fiber bundle composite materials with C fiber bundles being oriented in one direction as metal matrix composites were evaluated for tensile strength at room temperature. The relationship between the diameter and the tensile strength of the fiber bundles is as shown in FIG. 10 referred to previously. For comparison, the results of the measurement of Cu alone for tensile strength are also shown in FIG. 7. The tensile strength of the composite materials depends to a great extent upon the content of the fiber bundles, but does not greatly vary with the diameter of the fiber bundles. There is observed a tendency of slightly increasing in strength with an increase in diameter reaching a certain value of diameter, above which little variation in strength occurs.

This tendency was likewise observed in other composites with metal matrixes of other components, indicating that the composite materials comprising fiber bundles of a diameter in the range as expressed by the above formula (4) are those capable of fulfilling the objects of the present invention.

EXAMPLE 8

Here are illustrated some cases where the fiber bundles made in Example 4 were coated on their surfaces with coating material to inhibit the reaction between fiber bundles and matrix.

Coating methods and effects of the coatings are described with reference to an exemplary case of coating C medium-C fiber bundles with SiC. Coating methods include chemical vapor deposition, sol-gel method, slurry impregnation method and the like. In this case the coating was performed by a sol-gel method. That is, C fiber bundles with C medium were immersed in polysilane, dried, and this cycle was repeated several times, and then post-heat-treated in a vacuum at 1200° C. to coat the surfaces of the fiber bundles with SiC. The thickness of the coating layer was about 50 μm.

The C fiber bundles were used to produce composite materials with SiC matrix (a content of C fiber bundles: about 5% by volume) which were evaluated for three point probe flexure strength. When the diameter of the fiber bundles was 0.6 mm, without coating, the flexure strength was 320 MPa, while with coating it was 390 MPa. When the diameter of the fiber bundles was 1.2 mm, without coating, the flexure strength was 460 MPa, while with coating it was 495 MPa. In either case, the application of coating affords enhanced flexure strength. This is considered attributable to the coating layer provided on the surfaces of the fiber bundles which has effects of suppressing the reaction between the matrix and the fiber bundles in the sintering process, resulting in reduction in damages of the fiber bundles or defects at the interfacial boundaries between the matrix and the fiber bundles.

The identical process to those described above could apply to coating of other fiber bundles with coating materials other than SiC, such as C, TiC, $B_4C$, BN, TiN, $Si_3N_4$, AlN, $SiO_2$, $TiO_2$, $ZrO_2$, $Al_2O_3$, ZnO, MgO, $B_2O_3$, and $Ta_2O_5$. As coating methods, a chemical vapor deposition method and slurry impregnation method can be employed. Desired coating materials are those having no reactivity with the matrix and fiber bundles. Representative coatings applied onto fiber bundles as conducted in this example are listed in Table 4.

TABLE 4

| Fiber bundles (Medium) | Coating component | Fiber bundles (Medium) | Coating component |
|---|---|---|---|
| SiC (C) | C TiC BN | $Al_2O_3$ ($B_2O_3$) | $TiO_2$ $ZrO_2$ $Al_2O_3$ |
| C (C.$B_4$O) | $B_4$O BN |  | $B_2O_3$ $Ta_2O_5$ |
| $Si_3N_4$ (SiC) | SiC $Si_3N_4$ AlN | $Al_2O_3$ ($SiO_2$) | $Ta_2O_5$ ZnO MgO |
| SiC (SiC) | BN TiC | $Al_2O_3$ ($SiO_2$) | $Ta_2O_5$ $Al_2O_3$ |

EXAMPLE 9

Illustrative some cases where the resultant fiber bundle reinforced composite materials were coated on their surfaces with oxide ceramics and effects obtained are described. The following descriptions are made primarily with reference to an exemplary case of coating the surfaces of SiC—C fiber bundle composite materials, in which a SiC matrix is reinforced with C fiber bundles, with $ZrO_2$ coating.

The produced SiC—C fiber bundle composite materials were immersed in a slurry of $ZrO_2$ and dried, and this cycle was repeated several times, and thereafter heat-treated at 1400° C. for one hour to sinter the $ZrO_2$ coating. In this case, the SiC—C fiber bundle composite materials should preferably have a structure with no C fiber bundles being exposed out of the SiC matrix. This is because of preventing the C fiber bundles from reacting with oxide, $ZrO_2$. This process produced a $ZrO_2$ coating layer having a thickness of 0.5 mm.

The resulting SiC—C fiber bundle composite materials having $ZrO_2$ coating, together with SiC—C fiber bundle composite materials having no coating, were subjected to an oxidation test by heating in air at 1000° C. for 24 hours. As a result, the SiC—C fiber bundle reinforced composite materials without coating exhibited a weight loss of 4.3% while those having $ZrO_2$ coating did a weight loss of 0.9%. This is because of an effect of inhibition in surface oxidation owing to the presence of the oxide ceramic coatings. The samples after the oxidation test, they were evaluated for three point probe flexure strength. Without coating, the strength was 355 MPa, while with the $ZrO_2$ coating applied it was 425 mpa. This substantiates that there can be produced SiC—C fiber bundle composite materials which can be used stably even at high temperatures without deteriorating their characteristics.

The identical effects to those described above could be achieved in the cases with other coatings such as $SiO_2$, $TiO_2$, $Al_2O_3$, ZnO, MgO, $B_2O_3$, and $Ta_2O_5$. As coating methods, a chemical vapor deposition method and sol-gel method other than the method using slurry as described above can be employed. These coatings were applicable to composite materials having a matrix other than SiC. Representative coatings applied onto composite materials as conducted in this example are listed in Table 5.

In order to prevent fracture of the coating layer due to the difference of thermal expansion between the matrix and the coating layer, there may be provided an intermediate layer therebetween whose composition varies stepwise or gradually from that of the matrix to that of coating.

TABLE 5

| Matrix | Coating components | Matrix | Coating components |
|---|---|---|---|
| $Si_3N_4$ | $SiO_2$ $TiO_2$ | Mg | MgO $Al_2O_3$ |
| AlN | $SiO_2$ $Al_2O_3$ | $Nb_3Al$ | ZnO $ZrO_2$ |
| TiC | ZnO $B_2O_3$ | Stainless steel | ZnO $ZrO_2$ $SiO_2$ |
| $TiB_2$ | $B_2O_3$ $Ta_2O_3$ | Al—Cu alloy | $Al_2O_3$ |

EXAMPLE 10

This example illustrates a process for producing a fiber bundle reinforced composite material with inorganic fiber bundles being oriented in two directions in a matrix. The following description is made primarily with reference to a process for producing a SiC—C fiber bundle composite material comprising a SiC matrix having C fiber bundles with C medium oriented in two descriptions therein.

A green sheet was prepared with C fiber bundles and a SiC matrix in the same procedure as in Example 4. The C fiber bundles were disposed parallelly in one direction as uniformly on the resultant green sheet as possible. Several green sheets with oriented C fiber bundles were stacked with the direction of the fiber bundles on one sheet being perpendicular to those on the adjacent sheets and pressed at 15 MPa in the direction of the sheet stacking in air at 100° C. for one minute to form a shape. The resultant shape was sintered by hot-pressing at a pressure of 30 MPa in the direction of the sheet stacking under vacuum under heat at 2100° C. for one hour to produce a SiC—C fiber bundle composite material with the C fiber bundles being oriented in two directions.

In accordance with the same procedure, by using other matrix components and other fiber bundles, fiber bundle reinforced composite materials could be produced with fiber bundles being in two direction perpendicular to each other in the matrix. Moreover, Strengthening of matrix by precipitation of nano-sized particles enables production of high strength and high toughness ceramics. When the matrix is metallic, the use of metal plate as matrix component is allowed in the same manner as in Example 6. Green sheets may be laminated with the fiber bundles in one sheet intersecting those in the adjacent sheets at an angle to produce fiber bundle reinforced composite materials having the fiber bundles oriented in two directions intersecting at an optional angle.

EXAMPLE 11

This example illustrates a process for producing a fiber bundle reinforced composite material with fiber bundles being present in a three dimensional arrangement in a matrix. The following description is made primarily with reference to a process for producing a SiC—C fiber bundle composite material comprising a SiC matrix having C fiber bundles disposed in a three dimensional arrangement in a SiC matrix.

A slurry containing C fiber bundles and SiC matrix component was prepared in the same procedure as in Examples 4 and 5, except that the sintering aids for SiC used were B and C. In this case, the C fiber bundles was impregnated with a phenolic resin and then formed into a desired shape by using a frame and the like and heated to carbonize, thereby producing fiber bundles having a desired configuration. The resulting C fiber bundles were fixed in a metal mold, into which the slurry was cast and dried in air. This cycle was repeated several times to fill sufficiently the mold with the matrix component, and then the cast was removed from the mold and sintered at 2050° C. at one atmospheric pressure in an atmosphere of argon gas for one hour to produce a SiC—C fiber bundle composite materials with the C fiber bundles being present in a three dimensional arrangement.

In accordance with the same procedure, by using other matrix components and other fiber bundles, fiber bundle reinforced composite materials could be produced with fiber bundles being present in a three dimensional arrangement in the matrix. Moreover, Strengthening of matrix by precipitation of nano-sized particles enables production of high strength and high toughness ceramics. When the matrix is metallic, the matrix component can be heated to melt and the molten metal is filled in a mold and then cooled in the same manner as in Example 6. In order to increase the density of the resultant composite materials, application of sintering under hydrostatic pressure may be made.

When the length of the fiber bundles is relatively short, the fiber bundles may be mixed with the slurry of matrix components or molten metal and the mixture is extruded into a mold to form a shape which is sintered or cooled to solid, thereby producing a fiber bundle reinforced composite material with fiber bundles being present in a three dimensional arrangement.

EXAMPLE 12

An example with respect to a fiber bundle reinforced silicon nitride composite material is described. First a process for producing a bundle of carbon fibers is described. Several continuous carbon fibers of a pitch type were oriented in a parallel arrangement with each other, impregnated with a solution of a ratio by weight of phenolic resin to ethanol of 1:1, and heated in a vacuum at 2000° C. for one hour to solidify the phenolic resin to produce a C fiber bundle with C medium. In this case the number of C fiber bundles used may be varied to alter the diameter of the C fiber bundles. The content of C medium in the fiber bundles obtained in this process was about 60% by volume independently of the diameter of the fiber bundles.

Next, a process for producing a composite material is described. 70 parts by weight of a Si powder having an average particle size of 0.5 $\mu$m, 30 parts by weight of SiC having an average particle size of 3 $\mu$m were dry mixed by a RAIKAI mixer (automated mixer) and this powdery mixture was mixed in a predetermined amount of an organic solvent to produce a slurry which was formed into a green sheet by a doctor blade method. The C fiber bundles produced above were oriented in one direction as uniformly on the dried green sheet as possible. Several green sheets with oriented C fiber bundles were stacked with all the fiber bundles in the laminate being oriented in the same direction and pressed at 98 MPa in the direction of the sheet stacking to form a shape. The resulting shape was heated to a temperature of 1400° C. in an atmosphere of nitrogen to cause a sintering reaction, resulting in production of a SiC—C fiber bundle reinforced composite material bonded through silicon nitride linkage. The rate of contraction upon sintering was less than 0.2%.

Figure 15:
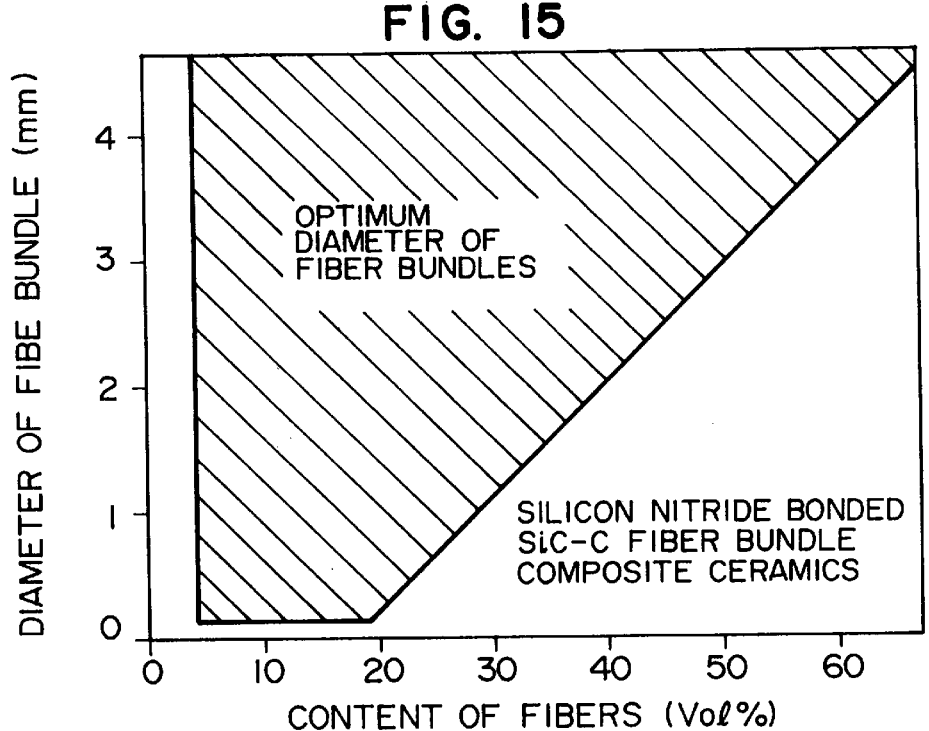
FIG. 15 is a graph showing the area of optimum diameter of the fiber bundles in a silicon nitride bonded SiC matrix-C fiber bundle reinforced composite material as a function of the diameter of the C bundles.

According to the process as described above, sintered composites were produced using varying contents of fiber bundles and varying diameters thereof. The results are shown in Table 6. The results of cases where the SiC powder was replaced by SiC whisker particles are also indicated in Table 6. FIG. 15 is a plot of the experimental results of Table 6 and those of other experiments conducted where the conditions within the shaded area allows production of high strength and high toughness composite materials. It has been found that the shaded area is consistent with the range indicated by the formula (3).

TABLE 6

| No. | Matrix | Amount of C fiber bundles (vol. %) | Diameter of C fiber bundle (mm) | Condition after sintering | Flexure strength (MPa) | Fracture toughness (MPa · m$^{1/2}$) |
|---|---|---|---|---|---|---|
| 1 | Si$_3$N$_4$ bonded SiC (SiC; 26 vol. %) | 10 | 1.5 | No cracking | 380 | 12 |
| 2 | Si$_3$N$_4$ bonded SiC (SiC; 20 vol. %) | 10 | 5.0 | No cracking | 420 | 12 |
| 4 | Si$_3$N$_4$ bonded SiC (SiC; 20 vol. %) | 40 | 1.0 | No cracking | 400 | 18 |
| 5 | Si$_3$N$_4$ bonded SiC | 50 | 1.0 | No cracking | 390 | 22 |

TABLE 6-continued

| No. | Matrix | Amount of C fiber bundles (vol. %) | Diameter of C fiber bundle (mm) | Condition after sintering | Flexure strength (MPa) | Fracture toughness (MPa · m$^{1/2}$) |
|---|---|---|---|---|---|---|
| 6 | Si$_3$N$_4$ bonded SiC (SiC; 20 vol. %) | 40 | 0.2 | Fine cracks | 160 | 2 |
| 7 | Si$_3$N$_4$ bonded SiC (SiC; 20 vol. %) | 40 | 1.2 | Fine cracks | 140 | 3 |
| 8 | Si$_3$N$_4$ bonded SiC (SiC; 5 vol. %) | 5 | 0.5 | No cracking | 440 | 11 |
| 9 | Si$_3$N$_4$ bonded SiC (SiC; 40 vol. %) | 5 | 0.5 | No cracking | 340 | 16 |
| 10 | Si$_3$N$_4$ bonded SiC (SiC; 20 vol. %) | 4 | 0.2 | No cracking | 380 | 10 |
| 11 | Si$_3$N$_4$ bonded SiC (SiC; 20 vol. %) | 3 | 0.2 | No cracking | 380 | 6 |
| 12 | Si$_3$N$_4$ bonded SiC whisker(SiC whisker; 20 vol. %) Diameter 3 μm, Length 100 μm | 5 | 0.2 | No cracking | 430 | 25 |
| 13 | Si$_3$N$_4$ bonded SiC whisker(SiC whisker; 20 vol. %) Diameter 1 μm, Length 100 μm | 5 | 0.2 | No cracking | 410 | 27 |
| 14 | Si$_3$N$_4$ bonded SiC whisker(SiC whisker; 5 vol. %) Diameter 3 μm, Length 200 μm | 15 | 1.2 | No cracking | 450 | 25 |

Figure 16:
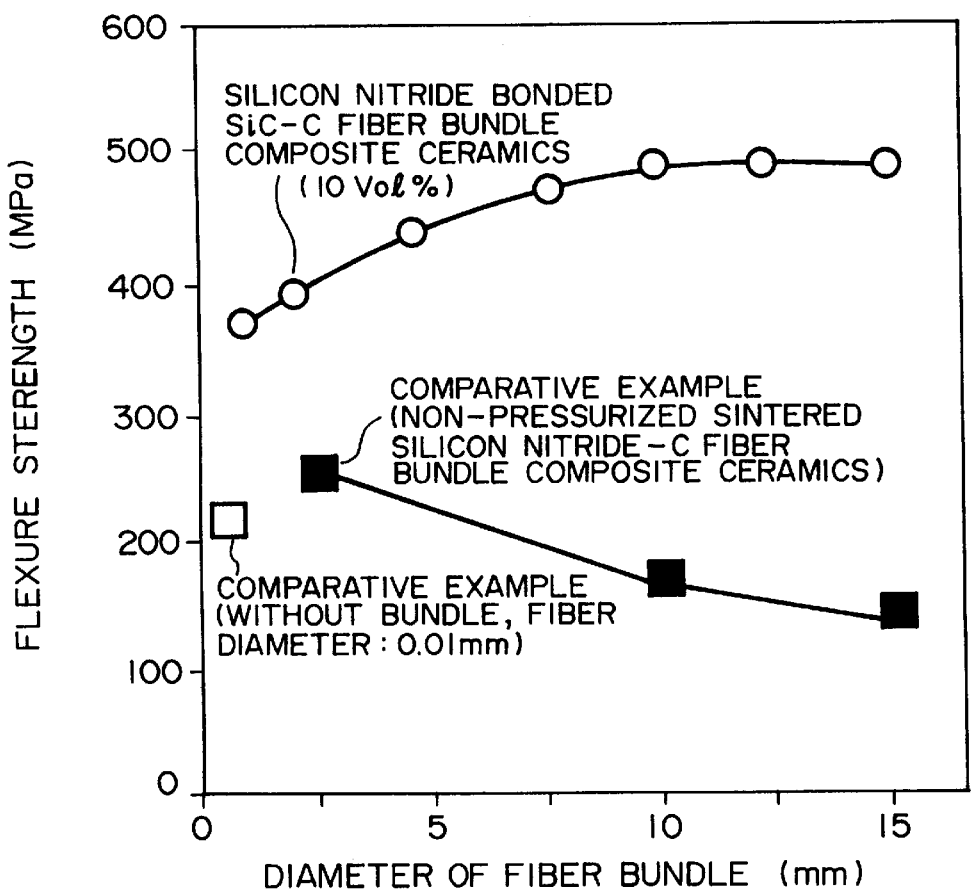
FIG. 16 is a graph showing the three point probe flexural strength at room temperature of a silicon nitride bonded carbon fiber bundle reinforced SiC ceramic as a function of the diameter of the carbon bundles.

The SiC—C fiber bundle composite materials having a content of C fiber bundles of about 10% by volume were evaluated for three point probe flexure strength at room temperature, and the results of the tests are shown in FIG. 16 in the relationship between the diameter of fiber bundles and the flexure strength. For comparison, FIG. 16 shows also the results of the evaluation of three point probe flexure strength for the silicon nitride-C fiber composite ceramics sintered under atmospheric pressure (sintering aids: MgO, Al$_2$O$_3$) with filaments being oriented instead of fiber bundles (designated □) and those with fiber bundles being oriented (designated ■).

It can be seen from FIG. 16 that an increase in diameter of fiber bundles results in an enhancement in strength of the composite materials to achieve a higher strength than those of the silicon nitride-C fiber bundle reinforced composite materials. This is because a linear contraction of the silicon nitride-C fiber bundle ceramics sintered under atmospheric pressure of 18% generated stresses between the fiber bundles and the matrix which caused a reduction in strength due to crack or the ultimately residual tensile stress in the sintered body. In contrast, the materials of the present invention exhibited a linear rate of contraction as low as 0.2% upon sintering to cause little development of stress between the fiber bundles and the matrix, which allows production of high strength materials. The use of oriented filaments instead of fiber bundles developed the residual tensile stress in the matrix owing to the difference in thermal expansion coefficient between the matrix and the carbon filaments with an reduction in strength.

With respect to strength at high temperatures, the composite materials of the present invention have a high strength at high temperatures independently of the diameter of fiber bundles. At room temperature, they can be improved in strength with increasing the diameter of fiber bundles, while at higher temperatures an enhancement in strength can be achieved independently of the diameter of fiber bundles. Thus the composite materials produced in accordance with the present invention are suitable in character for use in high temperature structural members.

Even when other silicon nitride bonded ceramics produced by sintering reaction are used as matrix, the relationship between the diameter of fiber bundles and the strength of the composite materials produced tends to be the same as shown previously. This is believed attributable to the larger diameter of fiber bundles affording an enhanced relaxation of the residual stresses, which have been generated due to the difference in thermal expansion coefficient between the fiber bundles and the matrix, as well as an reduction in the interfacial area between the matrix and the fiber bundles which affords reduced deficiency.

Other C fiber bundle reinforced composite materials were prepared in the identical process to that described above, except that the SiC powder was replaced by TiC, ZrC, B$_4$C, AlN, TiN, BN, ZrN, ZrB$_2$, Al$_2$O$_3$, mullite, and ZrO$_2$. As a result, in all the cases the C fiber bundle reinforced composite materials with C fiber bundles being oriented in one direction could easily be produced. In some cases, however, the matrix components, especially oxides, may react with C fiber bundles to cause deterioration in characteristics of the fiber bundles. It is desirable, therefore, to precoating the surfaces of fiber bundles as described in Examples above. From the foregoing, it is substantiated that the use of fiber bundles allows relatively easy production of composite materials comprising a ceramic matrix having fibers oriented in one direction therein.

EXAMPLE 13

This example illustrates a process for producing fiber bundles other than those in Example 12. The following description is made primarily with reference to C fiber bundles using C, SiC, TiC as medium.

First a process for producing a bundle of carbon fibers with polyvinyl alcohol as precursor is described. Several continuous carbon fibers of a pitch type were oriented in a parallel arrangement with each other, impregnated with a solution of polyvinyl alcohol to warm water mixed in a ratio by weight of 1:5, and heated in air at 80° C. for 2 to 3 hours to dry and then heated further for one hour at 300° C. to solidify the polyvinyl alcohol to produce a C fiber bundle with C medium. The content of C medium in the fiber bundles obtained in this process was 20 to 30% by volume independently of the diameter of the fiber bundles.

Next a process for producing a bundle of carbon fibers with SiC as medium is described. Several continuous carbon fibers were oriented in one direction, impregnated with polycarbosilane and heated in air at 350° C. for one hour to carbonize to produce a C fiber bundle with SiC medium. The content of SiC medium in the fiber bundles obtained in this process was about 50% by volume independently of the diameter of the fiber bundles.

Furthermore, a process for producing a bundle of carbon fibers with TiC and SiC as medium is described. Several continuous carbon fibers were oriented in one direction, impregnated with polytitanocarbosilane, heated under vacuum at 1400° C. for one hour to carbonize to produce a C fiber bundle with TiC and SiC medium. The content of TiC and SiC medium in the fiber bundles obtained in this process was about 30% by volume independently of the diameter of the fiber bundles.

In the same procedure, by impregnating with any one of precursors of $B_4C$, $BN$, $Si_3N_4$, $SiO_2$, $TiO_2$, $Al_2O_3$, $B_2O_3$ and $Ta_2O_5$, and then heating, one can produce inorganic fiber bundles comprising inorganic fibers other than C fibers with the medium derived from the selected precursor, i.e., bundles of SiC, B, B (W core), SiC (W core), SiC (C core), or $Al_2O_3$ fibers.

Fiber bundles containing two or more types of fibers can be similarly produced. The production of fiber bundles may be accomplished by impregnating the fibers with a slurry of medium components or by impregnation in chemical vapor phase, other than the impregnation with precursors and then heating as described above.

Using the inorganic fiber bundles other than C fibers as described above, fiber bundle reinforced composite materials with silicon nitride composite ceramic matrix were produced through sintering reaction as described in Example 12. It was confirmed that the formation of composites could be achieved in all the cases allowing relatively easy production of composite materials with the fibers being oriented in one direction. The results are listed in Table 7.

The silicon nitride-alumina fiber bundle reinforced composite ceramics produced through sintering reaction were evaluated for flexure strength at room temperature and at 1400° C. As a result, when the thermal expansion coefficient of the fiber bundles is higher than that of the matrix, a compression stress is imposed to the matrix so that high strength materials at room temperature can be obtained, though the compression stress is released at 1400° C. reducing the strength to ordinary level. Therefore, when the thermal expansion coefficient of the fiber bundles is higher than that of the matrix, the composite ceramics are more suitable for use at temperatures not higher than sintering temperature than the use at higher temperatures.

Although an attempt has been made to produce alumina fiber bundle composite materials with silicon nitride produced through sintering reaction, production of good sintered bodies could not be achieved due to the problems of contraction at sintering as well as to the reactions of alumina with silicon nitride at high temperatures of 1700° C. to 1800° C.

TABLE 7

| No. | Matrix | Fiber bundles | Fiber bundles binder | Flexure st.(MPa) | Fracture tough. (MPa · m$^{1/2}$) |
|---|---|---|---|---|---|
| 1 | $Si_3N_4$ bonded SiC (SiC; 20 vol. %) | SiC Bundle diameter: 2.5 μm Amount: 10 vol. % | Carbon | 430 | 12 |
| 2 | $Si_3N_4$ bonded SiC (SiC; 20 vol. %) | SiC Bundle diameter: 2.5 μm Amount: 10 vol. % | SiC $Si_3N_4$ | 460 | 13 |
| 3 | $Si_3N_4$ bonded SiC (SiC; 20 vol. %) | SiC Bundle diameter: 2.5 μm Amount: 10 vol. % | SiC | 460 | 13 |
| 4 | $Si_3N_4$ bonded SiC (SiC; 20 vol. %) | B Bundle diameter: 1.5 μm Amount: 10 vol. % | Carbon | 470 | 13 |
| 5 | $Si_3N_4$ bonded SiC (SiC; 20 vol. %) | $Si_3N_4$ Bundle diameter: 1.5 μm Amount: 10 vol. % | Carbon | 420 | 13 |
| 6 | $Si_3N_4$ bonded SiC (SiC; 20 vol. %) | SiC Bundle diameter; 1.5 μm Amount: 10 vol. % | SiC $Si_3N_4$ | 420 | 14 |
| 7 | $Si_3N_4$ bonded SiC (SiC; 20 vol. %) | B (W core) Bundle diameter: 1.8 μm Amount: 10 vol. % | Carbon | 410 | 11 |
| 8 | $Si_3N_4$ bonded SiC (SiC; 20 vol. %) | SiC (W core) Bundle diameter: 1.0 μm Amount: 10 vol. % | Carbon | 400 | 11 |
| 9 | $Si_3N_4$ bonded SiC (SiC; 20 vol. %) | SiC (C core) Bundle diameter: 1.0 μm Amount: 10 vol. % | TiC TiN | 380 | 11 |
| 10 | $Si_3N_4$ bonded $ZrO_2$ ($ZrO_2$; 10 vol. %) | SiC Bundle diameter: 1.0 μm Amount: 15 vol. % | $SiO_2$ | 380 | 12 |
| 11 | $Si_3N_4$ bonded ZrN (ZrN; 20 vol. %) | SiC Bundle diameter: 1.0 μm Amount: 15 vol. % | $SiO_2$ | 380 | 12 |

TABLE 7-continued

| No. | Matrix | Fiber bundles | Fiber bundles binder | Flexure st.(MPa) | Fracture tough. (MPa · m$^{1/2}$) |
|---|---|---|---|---|---|
| 12 | $Si_3N_4$ bonded TiN (TiN; 20 vol. %) | $Al_2O_3$ Bundle diameter: 1.0 μm Amount: 15 vol. % | AlN | 490 | 11 |
| 13 | $Si_3N_4$ bonded AlN (AlN; 20 vol. %) | SiC Bundle diameter: 1.0 μm Amount: 15 vol. % | $B_2O_3$ | 350 | 11 |
| 14 | $Si_3N_4$ bonded SiC (SiC; 30 vol. %) | SiC Bundle diameter: 1.0 μm Amount: 5 vol. % | $B_4C$ | 410 | 13 |

EXAMPLE 14

This example illustrates some cases where the fiber bundles made in Examples 12 and 13 were coated on their surfaces with coating material to inhibit the reaction with the matrix.

Coating methods and effects of the coatings are described with reference to an exemplary case of coating SiC medium-SiC fiber bundles with BN. Coating methods include chemical vapor deposition, sol-gel method, slurry impregnation method and the like. In this case the coating was performed by a sol-gel method. That is, the surfaces of SiC fiber bundles with SiC medium were coated with BN by spraying it. The thickness of the coating layer was about 50 μm.

The SiC fiber bundles were used to produce composite materials having SiC matrix bonded with silicon nitride produced through sintering reaction (a content of SiC fiber bundles: about 15% by volume) which were evaluated for three point probe flexure strength. When the diameter of the fiber bundles was 1.6 mm, without coating, the flexure strength was 320 MPa, while with coating it was 390 MPa. When the diameter of the fiber bundles was 5.0 mm, without coating, the flexure strength was 410 MPa, while with coating it was 480 MPa. In either case, the application of coating affords enhanced flexure strength. This is considered attributable to the coating layer provided on the surfaces of the fiber bundles which has effects of suppressing the reaction between the matrix and the fiber bundles in the sintering process, resulting in reduction in damages of the fiber bundles or defects at the interfacial boundaries between the matrix and the fiber bundles.

The identical process to those described above could apply to coating of other fiber bundles with coating materials other than BN such as C, TiC, $B_4C$, SiC, TiN, AlN, $SiO_2$, $TiO_2$, $ZrO_2$, $Al_2O_3$, ZnO, MgO, $B_2O_3$, and $Ta_2O_5$. As coating methods, a chemical vapor deposition method and slurry impregnation method can be employed. Desired coating materials are those having no reactivity with the matrix and fiber bundles.

EXAMPLE 15

Illustrative examples where the fiber bundle reinforced composite materials obtained above were coated on their surfaces with oxide ceramics and effects achieved are described. The following descriptions are made primarily with reference to an exemplary case of coating the surfaces of the composite materials comprising SiC matrix reinforced with C fiber bundle and bonded with silicon nitride produced through sintering reaction with $ZrO_2$ coating.

The produced SiC—C fiber bundle composite materials in which the SiC matrix was bonded with silicon nitride produced through sintering reaction were immersed in a slurry of $ZrO_2$ and dried, and this cycle was repeated several times, and thereafter heated at 1400° C. for one hour to sinter the $ZrO_2$ coating. In this case, the SiC—C fiber bundle reinforced composite materials having the SiC matrix bonded with silicon nitride produced through sintering reaction should preferably have a structure with no C fiber bundles being exposed out of the SiC matrix which was bonded with silicon nitride produced through sintering reaction. This is because of preventing the C fiber bundles from reacting with oxide, $ZrO_2$. This process produced a $ZrO_2$ coating layer having a thickness of 0.5 mm.

The resulting $ZrO_2$ coated SiC—C fiber bundle reinforced composite materials having the SiC matrix bonded with silicon nitride produced through sintering reaction, together with identical SiC—C fiber bundle reinforced composite materials, except that the latter had no coating, were subjected to an exposure test by heating in air at 1500° C. for 100 hours. As a result, the SiC—C fiber bundle reinforced composite materials having the SiC matrix bonded with silicon nitride produced through sintering reaction without coating exhibited a weight loss of 4.3%, while those with $ZrO_2$ coating did a weight loss of 0.1%. This is because of an effect of suppressing surface oxidation owing to the presence of the oxide ceramic coatings. The samples after the oxidation test were evaluated for three point probe flexure strength. Without coating, the strength was 230 MPa, while with the $ZrO_2$ coating applied it was 450 MPa. This substantiates that there can be produced SiC—C fiber bundle reinforced composite materials having the SiC matrix bonded with silicon nitride produced through sintering reaction which can be used stably even at high temperatures without deteriorating their characteristics.

The identical effects to those described above could be achieved in the cases with other coatings such as $SiO_2$, $Al_2O_3$ and $B_2O_3$. As coating methods, a chemical vapor deposition method and sol-gel method other than the method using slurry as described above can be employed. These coatings were applicable to composite materials having a matrix other than the SiC matrix bonded with silicon nitride produced through sintering reaction as well as composite materials having inorganic fiber bundles other than C fiber bundles.

In order to prevent fracture of the coating layer due to the difference of thermal expansion between the matrix and the coating layer, there may be provided an intermediate layer therebetween whose composition varies stepwise or gradually from that of the matrix to that of coating.

EXAMPLE 16

This example illustrates a process for producing a fiber bundle reinforced composite material with inorganic fiber bundles being oriented in two directions in the matrix. The following description is made primarily with reference to a process for producing a SiC—C fiber bundle reinforced composite material comprising a SiC matrix bonded with silicon nitride produced through sintering reaction having C fiber bundles with C medium oriented in two descriptions in the SiC matrix bonded with silicon nitride produced through sintering reaction.

A green sheet was prepared using components of C fiber bundles and a SiC matrix bonded with silicon nitride produced through sintering reaction in the same procedure as in Example 1. The C fiber bundles were disposed parallelly in one direction as uniformly on the resultant green sheet as possible. Several green sheets with oriented C fiber bundles were stacked with the direction of the fiber bundles on one sheet being perpendicular to those on the adjacent sheets and pressed at 98 MPa in the direction of the sheet stacking to form a shape. The resultant shape was heated in an atmosphere of ammonia to 1400° C. to effect sintering through nitriding reaction to produce a SiC—C fiber bundle reinforced composite material having the SiC matrix bonded with silicon nitride produced through sintering reaction.

In accordance with the same procedure, by using other matrix components and other fiber bundles, fiber bundle reinforced composite materials with fiber bundles being oriented in two direction perpendicular to each other in the matrix could be produced.

EXAMPLE 17

This example illustrates a process for producing a fiber bundle reinforced composite material with fiber bundles being present in a three dimensional arrangement in a matrix. The following description is made primarily with reference to a process for producing a SiC—C fiber bundle reinforced composite material comprising a SiC fiber reinforced and TiN particles dispersed matrix having C fiber bundles with C medium disposed in a three dimensional arrangement in the matrix.

A slurry containing C fiber bundles and components of the SiC fiber reinforced and TiN particles dispersed matrix was prepared in the same procedure as in Examples 1 and 5. In this case, the C fiber bundles was impregnated with a phenolic resin and then formed into a desired shape by using a frame and the like and heated to carbonize, thereby producing C fiber bundles having a desired configuration. The resulting C fiber bundles were fixed in a metal mold, into which the slurry was cast and dried in air. This cycle was repeated several times to fill sufficiently the mold with the matrix components, and then the cast was removed from the mold and subjected to nitriding treatment at up to 1400° C. in an atmosphere of a mixture of nitrogen and hydrogen (3%) to produce a SiC—C fiber bundle reinforced composite material having the SiC fiber reinforced and TiN particles dispersed silicon nitride matrix.

In accordance with the same procedure, by using other matrix components and other fiber bundles, fiber bundle reinforced composite materials with fiber bundles being present in a three dimensional arrangement in the matrix could be produced.

EXAMPLE 18

Twenty continuous carbon fibers of a PAN type were oriented in a parallel arrangement with each other, impregnated with a solution of a mixture of phenolic resin and ethanol in a ratio by weight of 1:1, and heated in a vacuum at 2000° C. for one hour to solidify the phenolic resin to produce a C fiber bundle (2 mm in diameter) with C medium. The content of C medium in the fiber bundles obtained in this process was about 60% by volume.

Next composite materials for matrix were prepared in the identical process to that described in Example 2. The C fiber bundles obtained as above were disposed parallelly in one direction as uniformly on the dried green sheet as possible. Several green sheets with the oriented C fiber bundles were stacked with all the fiber bundles in the laminate being oriented in one direction, and pressed at 98 MPa in the direction of the sheet stacking to form a shape. The content of the oriented C fiber bundles in the matrix was 20% by volume. The resultant shape was heated in an atmosphere of nitrogen to 1600° C. to cause a composite precipitation reaction and then subjected to a densification treatment at 1750° C. under a pressure of 100 kg/cm$^2$. In this process, there were produced SiC—C fiber bundle composite materials ceramics having the SiC fiber reinforced and TiN particles dispersed matrix which had a flexure strength of 1610 MPa and a fracture toughness of 18 MPa·m$^{1/2}$.

EXAMPLE 19

Figure 17A:
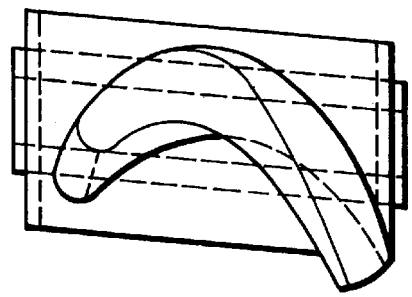
FIGS. 17A to 17C show diagrammatical views from various directions of a blade of a gas turbine.
Figure 17B:
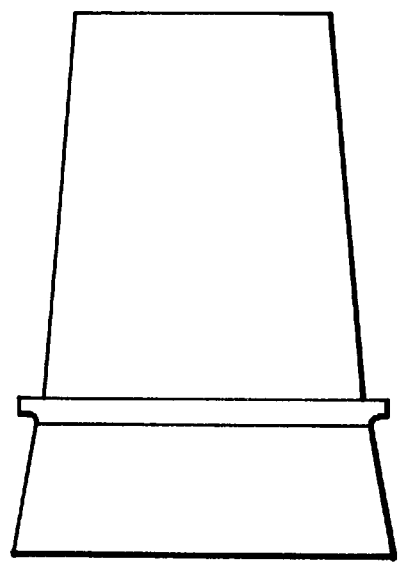
Figure 17C:
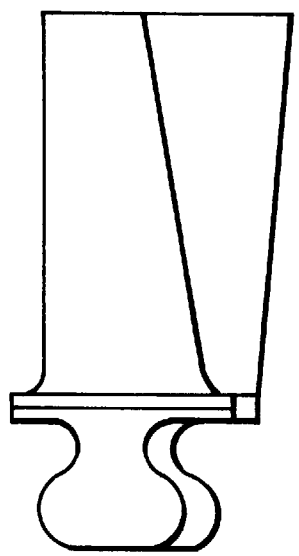
Figure 18:
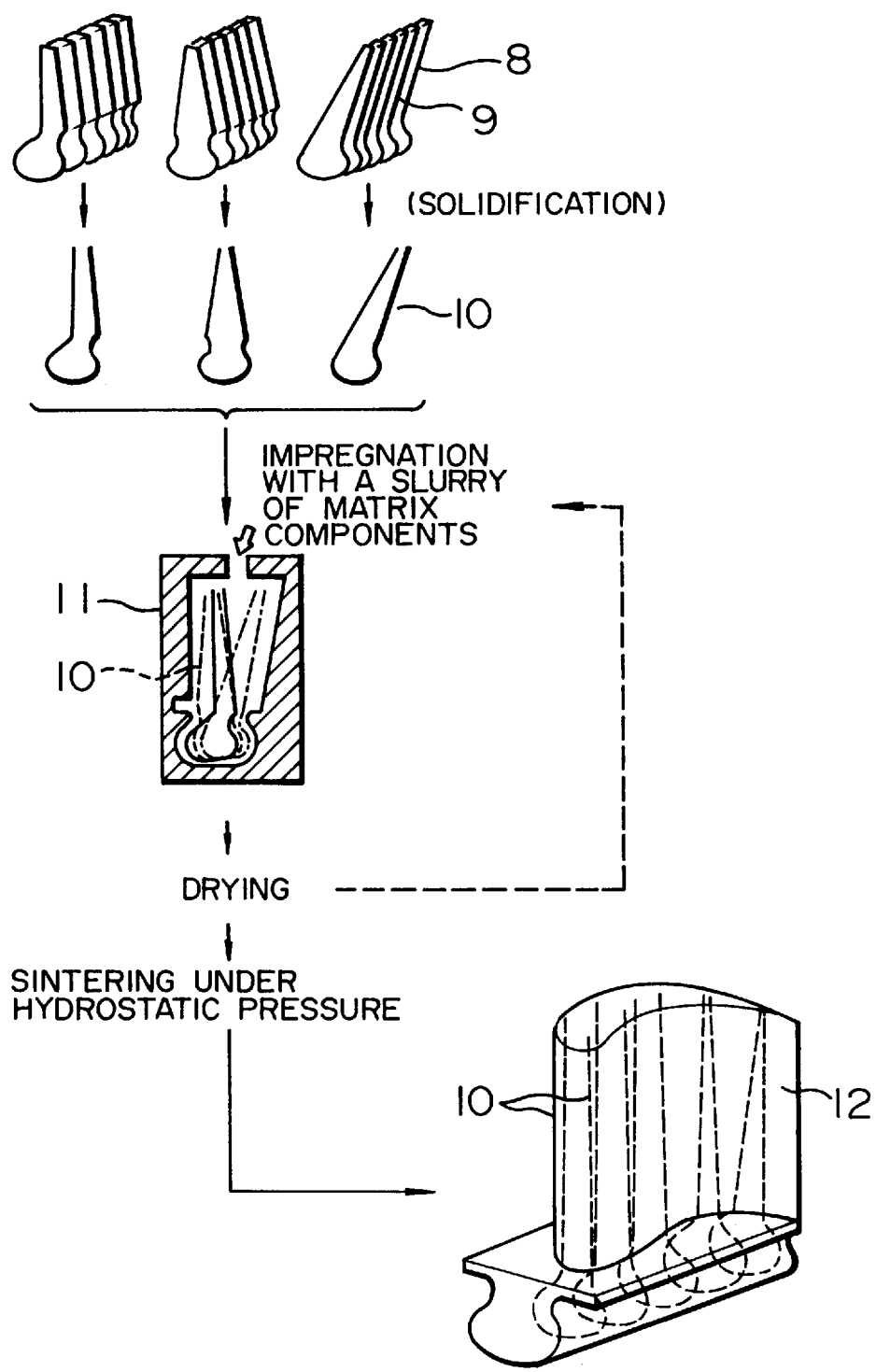
FIG. 18 shows, in diagrammatical views, how a gas turbine wing is manufactured according to the process of the present invention.

This example illustrates manufacture of mechanical parts, especially gas turbine blades, using the fiber bundle reinforced composite materials according to the present invention. First the configuration of a turbine wheel to be manufactured is shown FIGS. 17A, 17B and 17C. FIG. 18 is a schematic diagram of a process of manufacturing a turbine wheel using the composite materials in accordance with the present invention. In this example, the SiC ceramics bonded with silicon nitride produced through sintering reaction were used as matrix and the C fiber bundles with C medium were used as fiber bundles.

In FIG. 18, the reference number 8 designates a metal mold having a cross-section of a blade for molding with C fiber bundles, 9 does a C fiber bundles impregnated with a solution of a mixture of phenolic resin and ethanol in a ratio of 1:1, 10 does the C fiber bundles after solidified by heating the impregnated C fiber bundles, 11 is a half of a metal mold for molding turbine wheel, in which the C fiber bundles were impregnated with a slurry containing matrix components, 12 is a precipitated composite ceramic matrix of the turbine blade manufactured according to the process of the present invention. The C fiber bundles impregnated with the solution of a mixture of phenolic resin and ethanol 9 were heated in the state of being wound on the metal mold having a cross-section of the turbine blade to solidify the phenolic resin to produce the C fiber bundles 10 having the cross-section of the turbine blade. The C fiber bundles 10 were fixed in an array in the half metal mold 11, impregnated with a sufficient amount of the slurry, and then sintered through composite precipitation reaction to produce a turbine blade, in which the C fiber bundles 10 were oriented in one direction in the precipitated composite ceramic matrix 12.

Figure 19A:
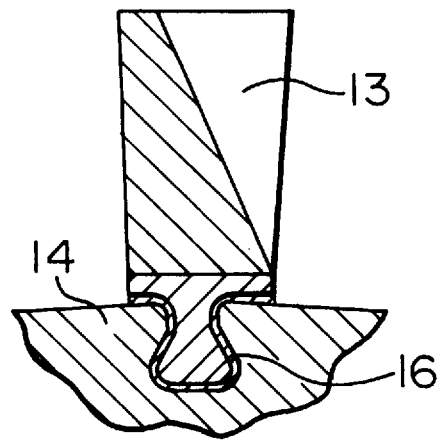
FIGS. 19A to 19C are a diagrammatical cross-sectional view showing how to fix a manufactured wing on a metal disk of a gas turbine.
Figure 19B:
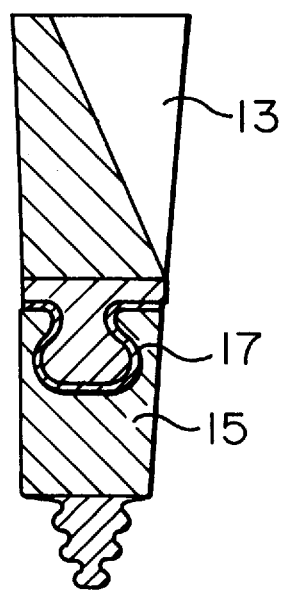
Figure 19C:
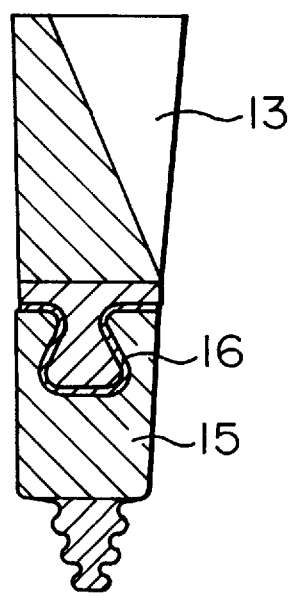

FIGS. 19A, 19B and 19C show schematic views of the structure of turbine wheel comprising a metal disk fixed with the turbine blades manufactured as described above. The turbine wheel shown in FIGS. 19A, 19B and 19C comprises the turbine blade 13 obtained above, a gas turbine metal disk 14, a metal shank 15 disposed between the blade 13 and the disk 14, a metal pad 16 disposed between the blade 13 and the disk 14 or the shank 15, and a ceramic engaging layer 17 disposed between the blade 13 and the shank 15.

In FIGS. 19A, 19B and 19C the turbine blade 13 may be attached by an engaging structure directly to the disk with the metal pad 16 being interposed therebetween, or by disposing the heat-resistant metal shank 15 between the turbine blade 13 and the disk 14, if necessary, to protect the metal disk from high temperatures. There may be placed the metal pad 16 or the ceramic engaging layer 17 between the turbine blade and the shank.

The manufactured turbine blade should preferably be coated on its surfaces with an oxide coating, if necessary, in order to improve the resistance to oxidation.

The process as described above can apply to other various configuration articles such as nozzles, burner, and the like besides the turbine blades, even when other matrix components than the matrix in this example as well as other fibers and mediums are employed.

EXAMPLE 20

The silicon nitride bonded SiC—C fiber bundle composite materials obtained in Example 12 were used to manufacture bearings for pumps. The bearings were made to have a structure where the ends of the carbon fibers were exposed out of the sliding surfaces. A sliding test at a rate of 10 m/s and a surface pressure of 50 kg/cm$^2$ indicated that the bearings had excellent sliding characteristics owing to lubricating effects of the carbon fibers. Thus the use of carbon fiber bundles renders the composite materials of the present invention excellent in sliding characteristics. Especially it was found that an amount of the carbon fiber bundles to be exposed of 10 to 50% by volume allows the bearings to a lower coefficient of friction and excellent in abrasion resistance.

EXAMPLE 21

Production of several kinds of short inorganic fiber bundles is illustrated.

First, a process for producing a short C fiber bundle using carbon as bundling agent (medium) is described. Several thousands continuous carbon fibers of a pitch type were oriented in a parallel arrangement with each other, impregnated with a solution of a mixture of phenolic resin to ethanol in a ratio by weight of 1:1, and heated in air at 300° C. for one hour to solidify the phenolic resin, thereby producing a C fiber bundle with C medium. The produced continuous C fiber bundles were cut into a desired length to produce short C fiber bundles. In this case the number of C fibers to be used may be varied to alter the diameter of the C fiber bundles. In this example, the number of C fibers used was 1000 to 48000 per bundle. The content of C medium in the short fiber bundles obtained in this process was about 50 to 60% by volume independently of the diameter of fiber bundles. The C fibers to be used include PAN (polyacrylonitrile) and cellulose types of fibers besides the pitch type.

Next, production of a short C fiber bundle with C medium by a process other than that as above is described. In this case polyvinyl alcohol was used as a precursor of the C medium. Several thousands continuous C fibers of a pitch type were oriented parallelly in one direction, impregnated with a solution of a mixture of polyvinyl alcohol and warm water of a ratio by weight of 1:1, dried by heating in air at 80° C. for 2 to 3 hours, then heated at 300° C. for one hour to solidify the polyvinyl alcohol, and cut to produce a short C fiber bundle with C medium. The content of C medium in the short fiber bundles obtained in this process was 20 to 30% by volume independently of the diameter of fiber bundles. In the two processes as described above, the heating temperatures were 300° C. resulting in insufficient carbiding of the precursor. However, sufficient carbiding could be achieved in the course of sintering in the production of composite materials. The content of medium may be controlled by varying the concentration of a solution of precursor and the number of impregnation cycles.

Next, a process for producing a short C fiber bundle with SiC medium is described. Several thousands continuous C fibers of a pitch type were oriented in parallel in one direction, impregnated with poly-carbosilane, then heated at 350° C. in air for one hour, and cut to produce a short C fiber bundle with SiC medium. The heating at a temperature of 350° C. resulted in insufficient thermal decomposition of the poly-carbosilane to convert into complete SiC. However, the conversion into SiC could be achieved in the course of sintering in the production of composite materials. The content of SiC medium in the short fiber bundles obtained in this process was about 50% by volume independently of the diameter of fiber bundles. The content of medium may be controlled by varying the concentration of a solution of precursor and the number of impregnation cycles.

Next, a process for producing a short C fiber bundle with TiC—SiC bundling agent is described. Several thousands continuous C fibers of a pitch type were oriented parallelly in one direction, impregnated with polytitanocarbosilane, and then heated in a vacuum at 1400° C. for one hour, and cut to produce a short C fiber bundle with the TiC—SiC medium. The content of TiC—SiC medium in the fiber bundles obtained in this process was about 30% by volume independently of the diameter of fiber bundles.

Moreover, a process for producing a Al$_2$O$_3$ short fiber bundle with B$_2$O$_3$ medium is described. Several thousands continuous Al$_2$O$_3$ fibers were oriented parallelly in one direction, immersed in a boron alkoxide expressed by the formula B(O-nC$_4$H$_9$)$_3$. The resulting immersed fibers were reacted with water in alcohol, then heat-treated at 100° C. for 10 hours, and cut to produce a Al$_2$O$_3$ short fiber bundle with the B$_2$O$_3$ bundling agent. The content of B$_2$O$_3$ bundling agent in the short fiber bundles obtained in this process was about 10% by volume independently of the diameter of fiber bundles. The content of medium may be controlled by varying the number of immersion and heat-treatment cycles.

In the same procedure, by impregnating with any precursor and heating, one can produce inorganic short fiber bundles comprising inorganic fibers other than Al$_2$O$_3$ fibers with the medium derived from the precursor, i.e., bundles of short fibers of SiC, B, B (W core), SiC (W core), SiC (C core), or Si$_3$N$_4$. With respect to combinations of fibers and mediums, a combination of a non-oxide and an oxide may possibly cause the deterioration in characteristics of short fiber bundles due to a great reaction between the fibers and the medium when heated to high temperatures in the subsequent sintering and the like treatments for producing composites, though the production of short fiber bundles is possible. Therefore, combinations of a non-oxide and a non-oxide, or an oxide and an oxide are preferred. Alternatively, the reactions can be prevented to some extent by precoating less reactive material, such as BN on the surfaces of the fibers. Representative examples of combinations of inorganic fiber bundles and medium other than those used in this example are listed in Table 8.

TABLE 8

| Inorganic fibers | Bundling agent |
|---|---|
| C | C.B$_4$C |
| SiC | C |

TABLE 8-continued

| Inorganic fibers | Bundling agent |
|---|---|
|  | SiC |
|  | TiC.SiC |
|  | C.B$_4$C |
| Si$_3$N$_4$ | C |
|  | SiC |
|  | Si$_3$N$_4$ |
|  | BN |
| B | BN |
|  | B$_4$C |
| B (W core) | BN |
|  | Si$_3$N$_4$ |
| SiC (W core) | C |
|  | SiC |
| SiC (C core) | C |
|  | SiC |
|  | C.B$_4$C |
| Al$_2$O$_3$ | SiO$_2$ |
|  | TiO$_2$ |
|  | Al$_2$O$_3$ |
|  | Ta$_2$O$_5$ |

EXAMPLE 22

First, a process for producing a SiC—C short fiber bundle reinforced composite ceramic comprising a SiC ceramic matrix reinforced in one direction with C short fiber bundles is described. The medium for the C short fiber bundles is carbon. A SiC powder which has been previously dry-mixed with 2% by weight of a BeO powder as sintering aid was ballmilled with the C short fiber bundles in a predetermined amount of organic solvent (binder) to produce a slurry. In this case, since there is a fear that the C short fiber bundles may be disintegrated during ball milling, they should preferably be preheated in a vacuum at a temperature of not less than 1000° C. to carbonize the C medium. The obtained slurry was extruded by an extruder equipped with a lattice type die into a mold to form a shape, which was dried in air at 60° C. for 3 to 4 hours. The resultant shape was sintered by hot-pressing at a pressure of 30 MPa in the direction perpendicular to the direction of the orientation of the short fiber bundles under vacuum under heat at 2100° C. for one hour to produce a SiC—C short fiber bundle reinforced composite ceramic.

Next, a process for producing a MgO—Al$_2$O$_3$ short fiber bundle reinforced composite ceramic comprising a MgO ceramic matrix reinforced in one direction with Al$_2$O$_3$ short fiber bundles is described. The medium for the Al$_2$O$_3$ short fiber bundles is B$_2$O$_3$. A MgO powder, Al$_2$O$_3$ short fiber bundles and a predetermined amount of binder were mixed to produce a slurry which was extruded by an extruder equipped with a lattice type die into a mold to form a shape, which was dried in air at 60° C. for 3 to 4 hours. The resultant shape was sintered by hot-pressing at a pressure of 30 MPa in the direction perpendicular to the direction of the orientation of the short fiber bundles in air under heat at 1250° C. for one hour to produce a MgO—Al$_2$O$_3$ short fiber bundle reinforced composite ceramic.

As described above, the extrusion of a slurry of short fiber bundles and matrix component allows relatively easily the production of short fiber bundle reinforced composite ceramics with short fiber bundles being oriented in one direction in the ceramic matrix.

EXAMPLE 23

This example illustrates a process for producing a short fiber bundle reinforced composite ceramic with the inorganic short fiber bundles produced in Example 21 being distributed in two directions in a matrix.

First a process for producing a SiC—C short fiber bundle reinforced composite ceramic comprising a SiC ceramic matrix reinforced in two directions with C short fiber bundles. The medium for the C fiber bundles is carbon. A SiC powder which has been previously drymixed with 2% by weight of a BeO powder as sintering aid was ball milled with the aforementioned C short fiber bundles in a predetermined amount of organic solvent (binder) to produce a slurry. In this case, since there is a fear that the C short fiber bundles may be disintegrated during ballmilling, they should preferably be preheated in a vacuum at a temperature of not less than 1000° C. to carbonize the C medium. The obtained slurry was formed by a doctor blade method into a green sheet with the C short fiber bundles being oriented in two directions. Several green sheets after drying were stacked and pressed under a pressure of 15 MPa in the direction of the sheet stacking in air at 100° C. for one minute to form a shape. The resultant shape was sintered by hot-pressing at a pressure of 30 MPa in the direction of the sheet stacking under vacuum under heat at 2100° C. for one hour to produce a SiC—C short fiber bundle reinforced composite ceramic.

Next, a process for producing a ZrB$_2$—C short fiber bundle reinforced composite ceramic comprising a ZrB$_2$ ceramic matrix reinforced in two direction with C short fiber bundles is described. The medium for the C short fiber bundles is SiC. A ZrB$_2$ powder, C short fiber bundles and a predetermined amount of binder were ballmilled to produce a slurry. In this case, since there is a fear that the C short fiber bundles may be disintegrated during ballmilling, they should preferably be preheated under vacuum at a temperature of 1300° C. to sinter the SiC medium. The obtained slurry was formed by a doctor blade method into a green sheet with the C short fiber bundles being oriented in two directions. Several green sheets after drying were stacked and pressed under a pressure of 15 MPa in the direction of the sheet stacking in air at 100° C. for one minute to form a shape. The resultant shape was sintered by hot-pressing at a pressure of 30 MPa in the direction of the sheet stacking under vacuum under heat at 1900° C. for one hour to produce a ZrB$_2$—C short fiber bundle reinforced composite ceramic.

When the green sheets are produced, provision of a longitudinal lattice frame on the gap of the blade permits the short fiber bundles to orient in one direction in the green sheets. Such green sheets may be stacked with all the short fiber bundles in the laminate being oriented in one direction to produce a composite ceramic unidirectionally reinforced with the short fiber bundles. Alternatively, such green sheets may be stacked with the orientation direction of the short fiber bundles in one sheet intersecting those in the adjacent sheets to produce a composite ceramic biaxially reinforced with the short fiber bundles.

As above, short fiber bundles reinforced composite ceramics with the short fiber bundles being oriented in two directions can be produced by preparing green sheets from a slurry of short fiber bundles and matrix component and stacking the sheets.

EXAMPLE 24

This example illustrates a process for producing a short fiber bundle reinforced composite ceramic comprising a matrix having inorganic short fiber bundles randomly distributed is described.

First a process for producing a SiC—C short fiber bundle reinforced composite ceramic comprising a SiC ceramic matrix reinforced randomly with C short fiber bundles is described. The medium for the C short fiber bundles is carbon. A SiC powder which has been previously dry-mixed with 2% by weight of a BeO powder as sintering aid was ball milled with the aforementioned C short fiber bundles in a predetermined amount of organic solvent (binder) to produce a slurry. In this case, since there is a fear that the C short fiber bundles may be disintegrated during ballmilling, they should preferably be preheated under vacuum at a temperature not lower than 1000° C. to carbonize the C medium. The obtained slurry was cast into a mold, and dried at 60° C. to produce a shape. The resultant shape was sintered at 2100° C. for one hour under hydrostatic pressure to produce a SiC—C short fiber bundle reinforced composite ceramic.

Since there may occur any reaction between the matrix and the short fiber bundles depending upon the components thereof resulting in deterioration in characteristics of the short fiber bundles, the combination of the matrix and the fiber bundles should be preferably an oxide and an oxide, or a non-oxide and a non-oxide. Alternatively, the reaction can be suppressed by precoating the surfaces of the short fiber bundles with coating materials as illustrated in Example 6.

Representative combinations of matrices and fiber bundles for short fiber bundle reinforced composite ceramic other than those made in the examples 22, 23, and 24 as described above are listed in Table 9.

TABLE 9

| | Inorganic short fiber bundles | | | Characteristics | |
| --- | --- | --- | --- | --- | --- |
| | | | | Three point | Fracture |
| Matrix | Short fiber bundles | Bundling agent | Reinforcement direction | flexure strength (MPa) | toughness $K_{IC}$ (MPa·m$^{1/2}$) |
| SiC | SiC | C | Uniaxial | 430 | 8.7 |
| TiC | SiC | SiC | Uniaxial | 450 | 7.3 |
| ZrC | SiC(C core) | SiC | Biaxial | 65 | 4.0 |
| B4C | C | C.B$_4$C | Uniaxial | 200 | 3.2 |
| Si$_3$N$_4$ | SiC | SiC | Uniaxial | 670 | 6.0 |
| Si$_3$N$_4$ | C | SiC | Random | 380 | 4.5 |
| AlN | Si$_3$N$_4$ | SiC | Uniaxial | 190 | 3.8 |
| TiN | B | BN | Uniaxial | 175 | 4.4 |
| BN | C | C.B$_4$C | Uniaxial | 70 | 3.5 |
| ZrN | Si$_3$N$_4$ | SiC | Uniaxial | 110 | 3.0 |
| ZrB$_2$ | C | SiC | Biaxial | 160 | 4.0 |
| ZrB$_2$ | SiC | SiC | Uniaxial | 295 | 5.8 |
| TiB$_2$ | B (W core) | BN | Uniaxial | 195 | 3.1 |
| CrB$_2$ | SiC | SiC | Uniaxial | 140 | 2.9 |
| Al$_2$O$_3$ | Al$_2$O$_3$ | B$_2$O$_3$ | Uniaxial | 300 | 6.9 |
| MgO | Al$_2$O$_3$ | B$_2$O$_3$ | Uniaxial | 200 | 4.3 |
| MgO | Al$_2$O$_3$ | SiO$_2$ | Random | 110 | 4.0 |
| Mullite | Al$_2$O$_3$ | SiO$_2$ | Uniaxial | 320 | 6.5 |
| ZrO$_2$ | Al$_2$O$_3$ | Ta$_2$O$_5$ | Uniaxial | 720 | 10.5 |

Next, a process for producing a Si$_3$N$_4$—C short fiber bundle reinforced composite ceramic comprising a Si$_3$N$_4$ ceramic matrix reinforced randomly with C short fiber bundles is described. The medium for the C short fiber bundles is SiC. A metallic Si powder and a SiC powder were mixed in a weight ratio of 2:3 and to the resulting mixture were added pure water, a predetermined amount of binder, and the C short fiber bundles, and thereafter the whole was mixed on a pot mill for 24 hours to produce a slurry. The slurry was cast into a water sorptive gypsum mold, and dried to produce a shape. The resultant shape was sintered under heat in a gaseous atmosphere of nitrogen at a pressure of 0.88 MPa, and left in the furnace to cool. The heating temperature and the retention time were varied multistepwise in a manner as at 1100° C. for 10 hours, at 1200° C. for 20 hours, at 1300° C. for 10 hours, and at 1350° C. for 5 hours to control the conversion of metal Si into Si$_3$N$_4$. This process could yield a Si$_3$N$_4$—C short fiber bundle reinforced composite ceramic with the C fiber bundles being randomly distributed in the matrix.

As above, the production of short fiber bundles reinforced composite ceramic with short fiber bundles being randomly distributed in ceramic matrix can relatively easily be accomplished by casting a slurry of short fiber bundles and matrix component in a mold, drying, shaping, and then sintering.

EXAMPLE 25

The short fiber bundles reinforced composite ceramics produced in Example 22 were evaluated for mechanical properties.

First SiC—C short fiber bundle reinforced composite ceramics with C short fiber bundles being oriented in one direction in SiC matrix were evaluated for three point probe flexure strength at room temperature and at a high temperature (under vacuum, 1500° C.). The samples used in the measurements were under the following conditions: the length of C short fiber bundles was about 20 mm, the content thereof was about 10% by volume, and the diameter of the short fiber bundles was varied. The results of the test for the three point probe flexure strength are shown in FIG. 21.

Figure 21:
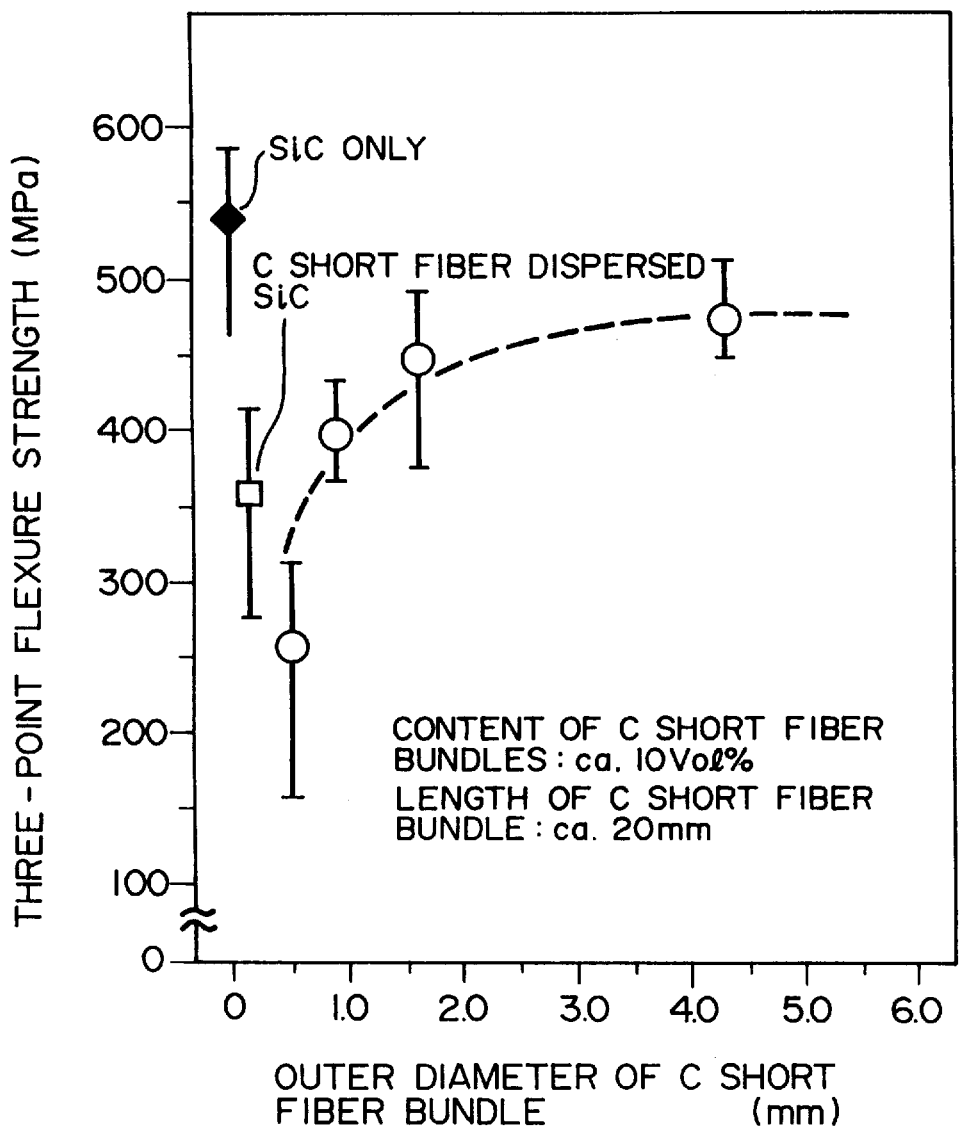
FIG. 21 is a graph showing the three point probe flexural strength at room temperature of a SiC matrix-C short fiber bundle reinforced ceramic as a function of the diameter of the C short bundles.

For comparison, the results of the measurements of SiC alone and SiC composites with C short fibers being oriented in one direction for the three point probe flexure strength are shown in FIG. 21. It can be seen from FIG. 21 that the strength of the composite ceramics can be enhanced with increasing the diameter of the C fiber bundles and reach a higher level of strength than achieved in the case of the short fibers distributed. This is considered attributable to an enhanced relaxation of the residual stresses (tensile in SiC), which have been generated due to the difference in thermal expansion coefficient between the C fiber bundles and the SiC matrix upon sintering, owing to an increase in the amount of matrix present between the fiber bundles with enlarging the diameter of the fiber bundles. Thus, at room temperature, the controlling of the diameter by using short fiber bundles enables an improvement in strength.

In all cases where other ceramics are used for matrix and other inorganic fiber bundles than C short fiber bundles are used, the relationship between the diameter of short fiber bundles and the strength of the resultant short fiber bundle reinforced composite ceramics follows the same trend as shown in the SiC—C short fiber bundle reinforced composite ceramics as described above. This is also believed attributable to the larger diameter of fiber bundles which has an effect affording an enhanced relaxation of the residual tensile stresses, which have been generated due to the difference in thermal expansion coefficient between the short fiber bundles and the matrix, and the smaller interfacial area between the matrix and the short fiber bundles with a reduction in defects.

Figure 22:
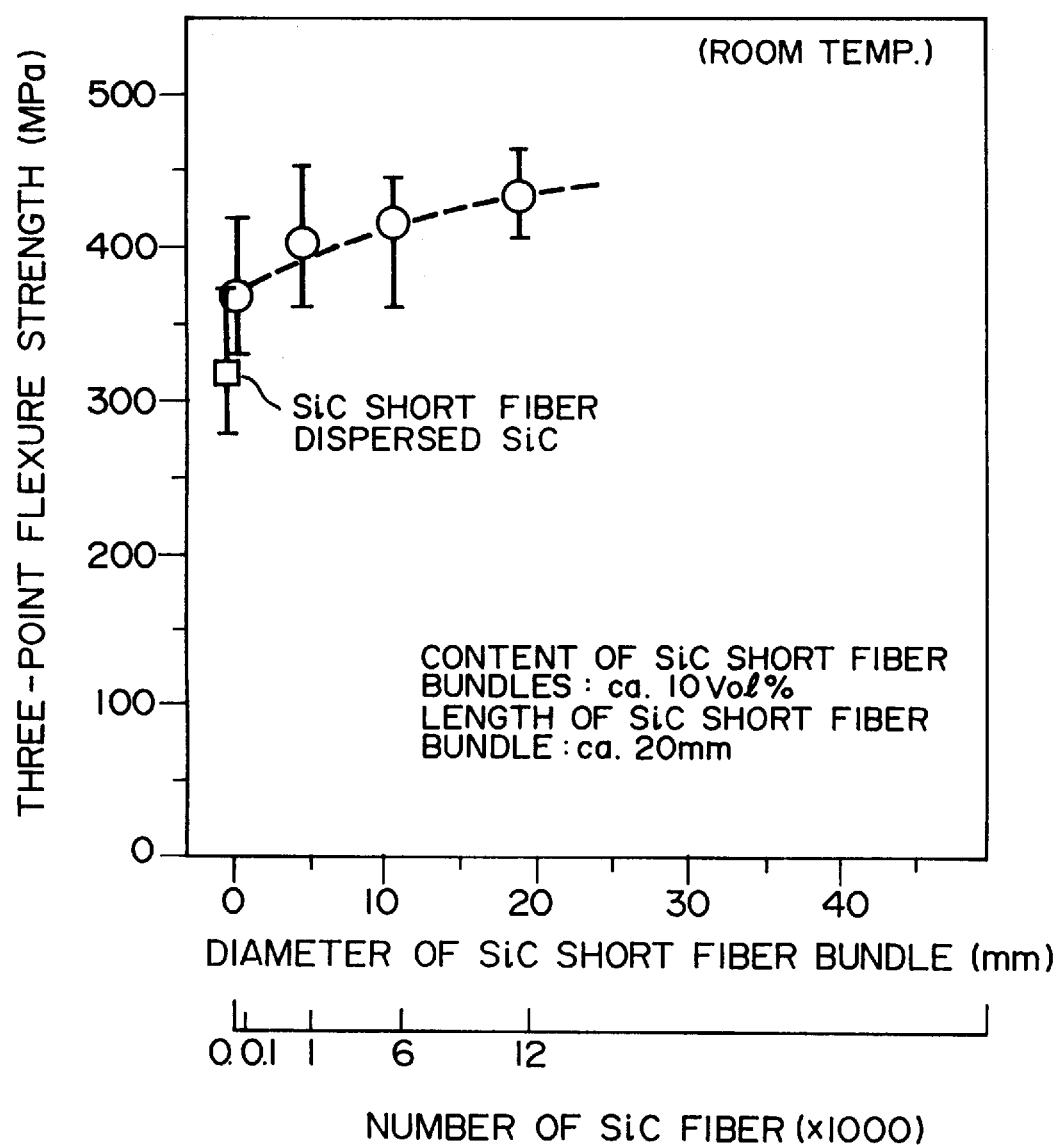
FIG. 22 is a graph showing the three point probe flexural strength at room temperature of a SiC matrix-SiC short fiber bundle reinforced ceramic as a function of the diameter of the C short bundles.

From the results of the measurement of SiC—C short fiber bundles reinforced composite ceramics for flexure strength as described above, when the diameter of C short fiber bundles is about 0.5 mm, the composite ceramics have a lower strength than that of the C short fiber distributed SiC indicating that this level of diameter has presumably no effect of increasing the strength. In other component systems, for example, SiC—SiC short fiber bundle reinforced composite ceramics with SiC short fiber bundles (C medium) being oriented in one direction in the SiC matrix as shown in FIG. 22, there is a case where an effect of an increase in strength is observed with short fiber bundles even in the range of considerably small diameter thereof. Therefore, the diameter of short fiber bundles to be applied is in the range of 0.05 to 10 mm, and preferably 1 to 6 mm taking account of effects in workability during production and fracture toughness as described later.

Figure 23:
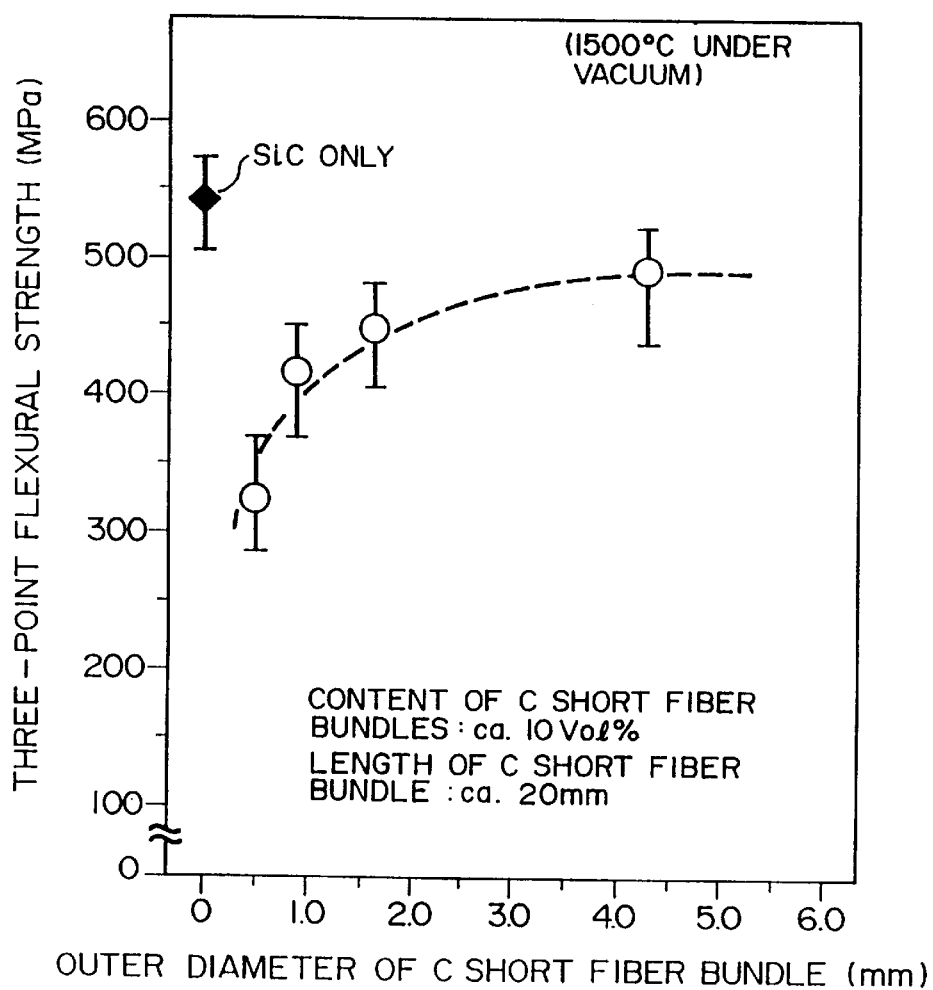
FIG. 23 is a graph showing the three point probe flexural strength at a high temperature of 1500° C. in vacuum of a SiC matrix-C short fiber bundle reinforced ceramic as a function of the diameter of the C short bundles.

Next the SiC—C short fiber bundle reinforced composite ceramics as described above were evaluated for three point probe flexure strength at high temperature (under vacuum, 1500° C.), and the results are shown in FIG. 23. The strengths obtained at high temperatures tend to be higher than those at room temperature and the fluctuation in strength became small. This is considered owing to relaxation of the residual tensile stresses generated in the matrix at high temperatures, which renders the strengths at high temperatures relatively higher than those at room temperature resulting in stabilization in strength. Thus the composite ceramics of the present invention are not lowered in strength even at high temperatures, and have less fluctuant, stable, strength. Therefore, the composite ceramics of the present invention have a higher strength at higher temperatures so that they are composite materials having characteristics suitable as structural materials to be used at high temperatures.

Figure 24A:
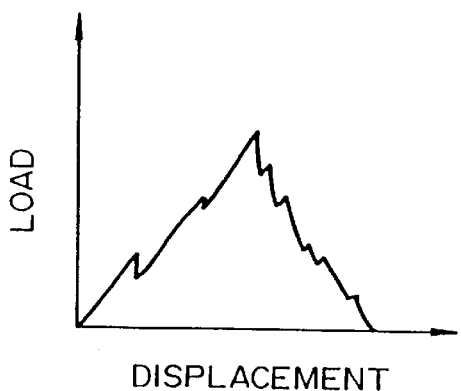
FIGS. 24(a) and (b) are graphs showing a load vs displacement curve when a SiC matrix-C short fiber bundle reinforced ceramic was subjected to a flexural test under load.
Figure 24B:
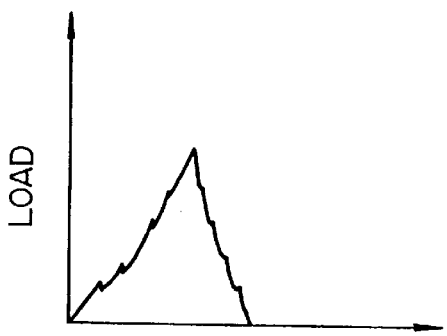

FIG. 24 shows schematically curves representing the relationship between load and displacement when the composite ceramics were evaluated for three point probe flexure strength. For comparison the results for the SiC composite ceramics with C short fibers being oriented in one direction are also shown in the figure. The use of short fiber bundles resulted in remarkable development of non-linear fracture mode as compared with the case where short fibers were distributed, indicating that the produced short fiber bundle reinforced composite ceramics are materials capable of suppressing the propagation of cracking and of inhibiting abrupt rupture.

Figure 25:
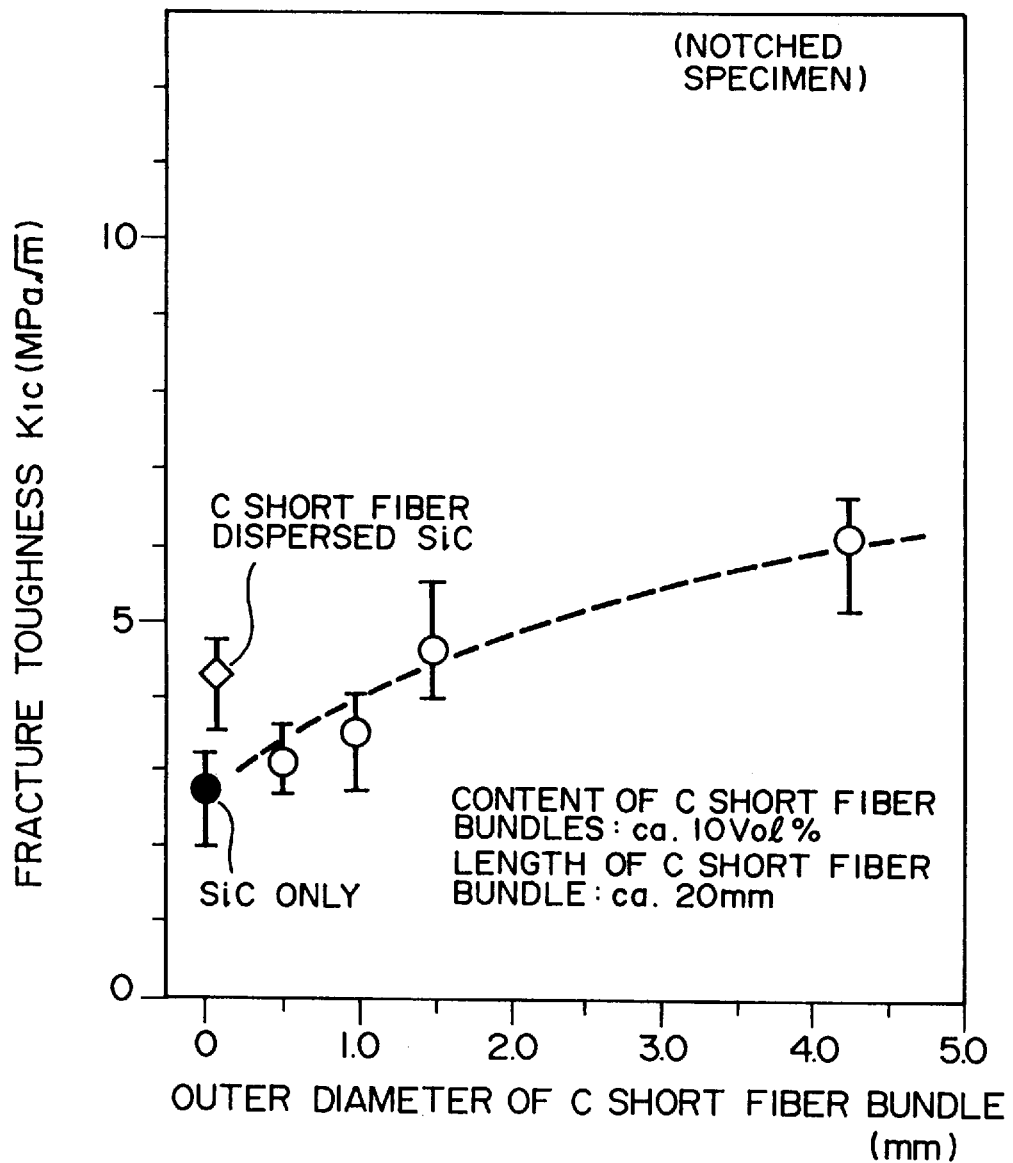
FIG. 25 is a graph showing the relationship between the rupture toughness and the diameter of C fiber bundle of a SiC matrix-C short fiber reinforced ceramic.

The same samples as above were evaluated for fracture toughness and the results are shown in FIG. 25. For comparison the results for the SiC composite ceramics with C short fibers being oriented in one direction are also shown in the figure. The use of short fiber bundles resulted in higher toughness as compared with the case where short fibers were distributed, indicating that the toughness is enhanced with increasing the diameter of fiber bundles. This may presumably be caused for the following reasons: The short fibers may react with the matrix to cause the deterioration in characteristics, whereas the short fiber bundles are subjected to such reaction only on the peripheral area thereof to retain the fiber characteristics and there may occur release of fibers from the short fiber bundles or deflection of crackings.

The aspects as described above can likewise be observed for short fiber bundle reinforced composite ceramics having a ceramic matrix or fiber bundles of other components. Thus it is substantiated that they are those capable of fulfilling the objects of the present invention.

EXAMPLE 26

This example illustrates coating of the surfaces of the short fiber bundles made in Examples 21 with coating material to inhibit the reaction with the matrix.

Coating methods and effects of the coatings are described with reference to an exemplary case of coating C short fiber bundles having carbon matrix with SiC. Coating methods include chemical vapor deposition, sol-gel method, slurry impregnation method and the like. In this case the coating was performed by a sol-gel method. That is, the surfaces of C fiber bundles with C medium were immersed in polysilane, dried, and this cycle was repeated several times, followed by heat-treating under vacuum at 1200° C. to coat the surfaces with SiC. The thickness of the coating layer was about 50 $\mu$m. The coating was performed on the short fiber bundles after cutting for coating also the cut surfaces, though the coating may be performed on continuous fiber bundles before cutting.

The C short fiber bundles were used to produce SiC—C short fiber bundle reinforced composite ceramic comprising SiC matrix having C short fiber bundles oriented in one direction (a content of C short fiber bundles: about 10% by volume) which were evaluated for three point probe flexure strength at room temperature. When the diameter of the fiber bundles was 0.5 mm, without coating, the flexure strength was 260 MPa, while with coating it was 290 MPa. When the diameter of the fiber bundles was 1.7 mm, without coating, the flexure strength was 450 MPa, while with coating it was 470 MPa. In either case, the application of coating affords enhanced flexure strength. This is considered attributable to the coating layer previously provided on the surfaces of the short fiber bundles which has effects of suppressing the reaction between the matrix and the short fiber bundles during sintering, resulting in reduction in damages of the short fiber bundles or defects at the interfacial boundaries between the matrix and the fiber bundles.

The identical process to those described above could apply to coating of other short fiber bundles with coating materials other than SiC such as C, TiC, $B_4C$, BN, TiN, $Si_3N_4$, AlN, $SiO_2$, $TiO_2$, $ZrO_2$, $Al_2O_3$, ZnO, MgO, $B_2O_3$, and $Ta_2O_5$. As coating methods, a chemical vapor deposition method and slurry impregnation method can be employed. Desired coating materials are those having no reactivity with the matrix and short fiber bundles. Representative examples of coating short fiber bundles conducted in this example are listed in Table 10.

TABLE 10

| Inorganic fibers | Bundling agent | Coating components on short fiber bundles |
|---|---|---|
| SiC | C | C |
| | | TiC |
| | | BN |
| C | C.B$_4$C | B$_4$C |
| | | BN |
| Si$_3$N$_4$ | SiC | SiC |
| | | Si$_3$N$_4$ |
| | | AlN |
| SiC | SiC | BN |
| | | TiC |
| Al$_2$O$_3$ | B$_2$O$_3$ | TiO$_2$ |
| | | ZrO$_2$ |
| | | Al$_2$O$_3$ |
| | | B$_2$O$_3$ |
| | | Ta$_2$O$_5$ |
| Al$_2$O$_3$ | SiO$_2$ | Ta$_2$O$_5$ |
| | | ZnO |
| | | MgO |
| Al$_2$O$_3$ | Ta$_2$O$_5$ | Ta$_2$O$_5$ |
| | | Al$_2$O$_3$ |

EXAMPLE 27

Figure 26:
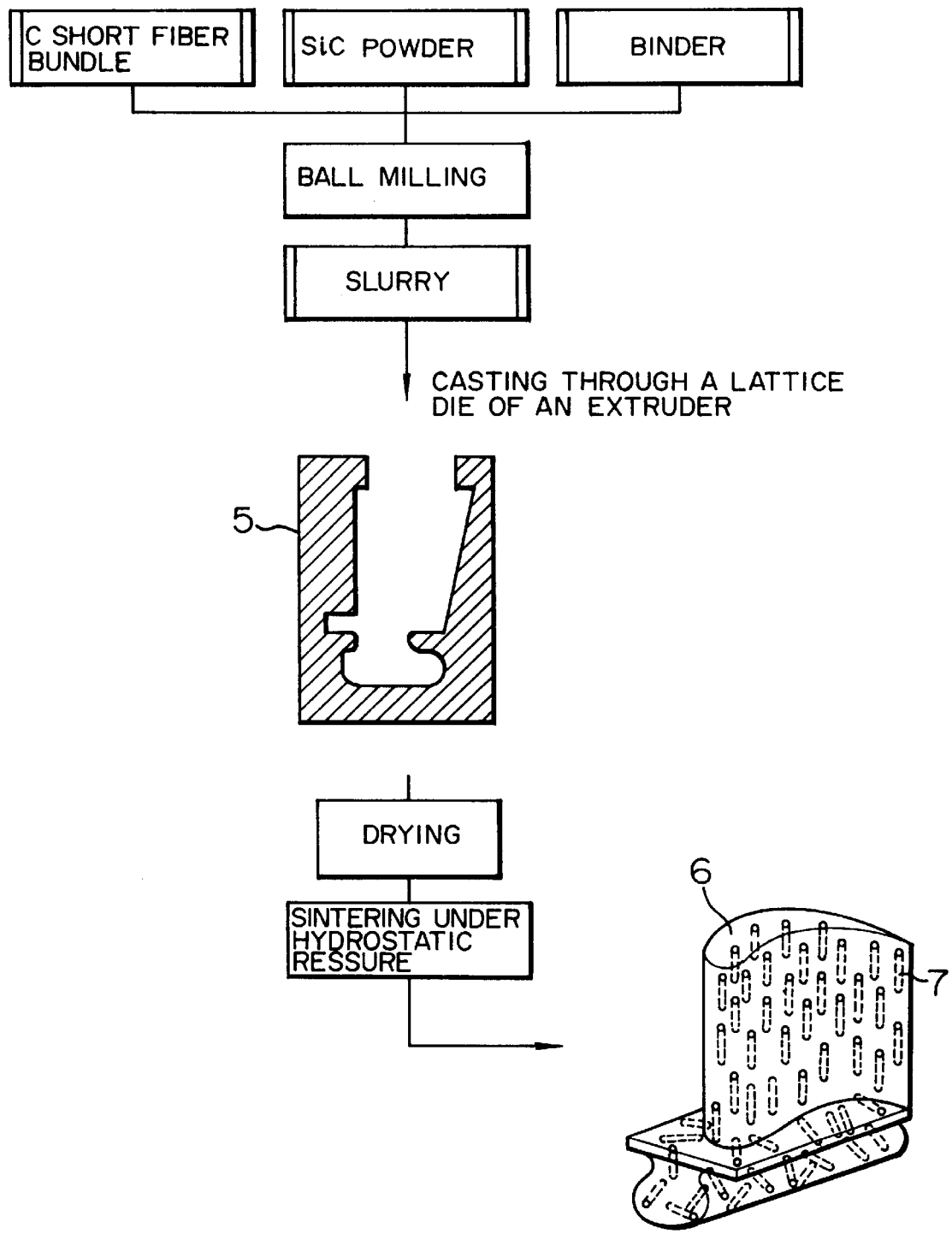
FIG. 26 is a block diagram with some diagrammatical views of a process of producing a gas turbine wing with a SiC matrix-C short fiber bundle reinforced ceramic.

This example illustrates manufacture of gas turbine blades as mechanical parts, to which the short fiber bundle reinforced composite ceramics according to the present invention are applied. FIG. 26 shows a diagram of a process of manufacturing a turbine wheel using the short fiber bundle reinforced composite ceramics in accordance with the present invention. In this example, the SiC ceramic was used as matrix, BeO was a sintering aid, and the C short fiber bundles with C medium were used as short fiber bundles.

In FIG. 26, the reference number 18 designates a metal mold having a cavity of a blade configuration for castin a slurry of components of C short fiber bundles and matrix, 19 is a SiC blade matrix to be produced by the present process, 20 is the C short fiber bundles to be dispersed in the blade made by the present process. The C short fiber bundles, a SiC powder and a binder were mixed to produce a slurry which was injected into a metallic half mold 18 through a lattice type die of an extruder. After drying, the shape was removed from the metallic half mold, and then sintered under hydrostatic pressure to produce a turbine blade, in which the C short fiber bundles 20 were oriented almost in one direction in the SiC matrix 19.

The process as described above can apply to production of other various configuration articles other than the turbine blades, even when other matrix components as well as other short fiber bundles and mediums are employed.

TABLE 11

| | | Primary composition of sintered body | | |
|---|---|---|---|---|
| Starting materials | Atmosphere | Matrix | Dispersed particles | Dispersed fiber |
| Si TiC | N$_2$ | Si$_3$N$_4$ | TiN SiC | SiC |
| Si WC | N$_2$ | Si$_3$N$_4$ | W SiC | SiC |
| Si AlC | N$_2$ | Si$_3$N$_4$ | AlN SiC | SiC |
| Si MoC | N$_2$ | Si$_3$N$_4$ | Mo SiC | SiC |
| Si | N$_2$ | Si$_3$N$_4$ | NbN | SiC |

TABLE 11-continued

| | | Primary composition of sintered body | | |
|---|---|---|---|---|
| Starting materials | Atmosphere | Matrix | Dispersed particles | Dispersed fiber |
| NbC | | | SiC | |
| Si B$_4$C | N$_2$ | Si$_3$N$_4$ | BN SiC | SiC |
| Si CrC | N$_2$ | Si$_3$N$_4$ | CrN SiC | SiC |
| Si ZrC | N$_2$ | Si$_3$N$_4$ | ZrN SiC | SiC |
| Si TaC | N$_2$ | Si$_3$N$_4$ | TaN SiC | SiC |
| Si HfC | N$_2$ | Si$_3$N$_4$ | HfN SiC | SiC |
| Si VC | N$_2$ | Si$_3$N$_4$ | VN SiC | SiC |
| Si TiB$_2$ | N$_2$ | Si$_3$N$_4$ | TiN BN | TiN |
| Si W$_2$B | N$_2$ | Si$_3$N$_4$ | W BN | W |
| Si YbB$_2$ | N$_2$ | Si$_3$N$_4$ | YbN BN | YbN |
| Si MoB$_2$ | N$_2$ | Si$_3$N$_4$ | Mo BN | Mo |
| Si NbB$_2$ | N$_2$ | Si$_3$N$_4$ | NbN BN | YbN |
| Si CrB$_2$ | N$_2$ | Si$_3$N$_4$ | CrN BN | CrN |
| Si ZrB$_2$ | N$_2$ | Si$_3$N$_4$ | ZrN BN | ZrN |
| Si TaB$_2$ | N$_2$ | Si$_3$N$_4$ | TaN BN | TaN |
| Si HfB$_2$ | N$_2$ | Si$_3$N$_4$ | HfN BN | HfN |
| Si VSi$_2$ | N$_2$ | Si$_3$N$_4$ | VN | Si$_3$N$_4$ |
| Si TiSi$_2$ | N$_2$ | Si$_3$N$_4$ | TiN | Si$_3$N$_4$ |
| Si TiAl$_2$ | N$_2$ | Si$_3$N$_4$ | TiN AlN | TiN AlN |
| Si TiAl$_2$ C | N$_2$ | Si$_3$N$_4$ | TiN AlN SiC | TiN AlN SiC |
| Si TiO$_2$ C | N$_2$ + H$_2$ | Si$_3$N$_4$ | TiN SiC | TiN SiC |
| Si Nb$_3$Al$_2$ C | N$_2$ | Si$_3$N$_4$ | NbN AlN SiC | NbN AlN SiC |
| Si SiO$_2$ C | N$_2$ + H$_2$ | Si$_3$N$_4$ | SiC | SiC |
| Si Zr$_2$Si C | N$_2$ | Si$_3$N$_4$ | ZrN SiC | ZrN SiC |
| Si TiAl | N$_2$ | Si$_3$N$_4$ | TiN AlN | TiN AlN |
| Si ZrB | N$_2$ | Si$_3$N$_4$ | ZrN BN | ZrN |
| Si WB | N$_2$ | Si$_3$N$_4$ | WN W BN | WN |
| Si VB$_2$ | N$_2$ | Si$_3$N$_4$ | VN BN | VN |
| Si ZrAl | N$_2$ | Si$_3$N$_4$ | ZrN AlN | ZrN AlN |
| Si HfSi$_2$ | N$_2$ | Si$_3$N$_4$ | HfN | HfN |
| Si SiO$_2$ | N$_2$ + H$_2$ + CO | Si$_3$N$_4$ | SiC | SiC |
| Ti Nb$_3$Al C | N$_2$ | TiN | NbN AlN TiC | NbN AlN TiC |
| Ti WC | N$_2$ | TiN | W TiC | TiC W |
| Al WC | N$_2$ | AlN | W | W |

TABLE 11-continued

| | | Primary composition of sintered body | | |
|---|---|---|---|---|
| Starting materials | Atmosphere | Matrix | Dispersed particles | Dispersed fiber |
| Al TiAl | $N_2$ | AlN | TiN | TiN |
| Si ZrAl | $N_2$ + CO | $Si_3N_4$ | $ZrO_2$ $Al_2O_3$ | $ZrO_2$ $Al_2O_3$ |
| Al $VSi_2$ | $N_2$ | AlN | VN $Si_3N_4$ | $Si_3N_4$ |
| Al $TiSi_2$ | $N_2$ | AlN | TiN $Si_3N_4$ | $Si_3N_4$ |
| Al $HfSi_2$ | $N_2$ | AlN | HfN $Si_3N_4$ | $Si_3N_4$ |
| Al $LaSi_2$ | $N_2$ | AlN | La $Si_3N_4$ | $Si_3N_4$ |
| Al YSi | $N_2$ | AlN | YN $Si_3N_4$ | $Si_3N_4$ |
| Al $WSi_2$ | $N_2$ | AlN | W $Si_3N_4$ | $Si_3N_4$ |
| Al $MnSi_2$ | $N_2$ | AlN | Mn $Si_3N_4$ | $Si_3N_4$ |

What is claimed is:

1. A process for producing a fiber bundle reinforced ceramic or metal matrix composite material comprising:
   a) impregnating more than one plurality of inorganic fibers oriented in one direction with at least one of precursors capable of forming at least one selected from the group consisting of C, SiC, TiC, BN, $Si_3N_4$, $B_4C$, $SiO_2$, $TiO_2$, $Al_2O_3$, $B_2O_3$ and $Ta_2O_5$;
   b) heating the impregnated fibers to form solidified inorganic fiber bundles;
   c) mixing the fiber bundles with either:
      1) a slurry of ceramic components; or
      2) a molten metal;
   d) extruding the mixture to shape; and
   e) drying the shape and sintering the dried shape if the mixture comprises (1) to provide said ceramic matrix composite material, or cooling the shape to solidification if the mixture comprises (2) to provide said metal matrix composite material.

2. The process for producing a fiber bundle reinforced composite material according to claim 1, wherein said ceramic matrix comprises a powder of at least one metal selected from the group consisting of Si, Al, Cr, Ti, Zr, Mg, B, Y, W, Nb, V, Sc, La, Hf, Mo, Ce, Yb, Er, Ho and Dy, or a powdery mixture of said metal powder and particles of at least one ceramic selected from the group consisting of nitrides, carbides, oxides, carbonitrides, oxynitrides, borides, intermetallic compounds of Si, Al, Cr, Ti, Zr, Mg, B, Y, W, Nb, V, Sc, La, Hf, Mo, Ce, Yb, Er, Ho and Dy, and said sintering is in situ precipitation sintering in a reactive gaseous atmosphere of at least one selected from the group consisting of nitriding, carbiding, carbonitriding, oxidizing, and oxynitriding atmospheres.

3. The process for producing a fiber bundle reinforced composite material according to claim 1, wherein said inorganic fiber bundles have a diameter of 0.05 mm to 10.0 mm.

4. The process for producing a fiber bundle reinforced composite material according to claim 1, wherein said inorganic fiber bundles are coated on the surfaces thereof with at least one selected from the group consisting of SiC, $Si_3N_4$, $SiO_2$, C, TiC, $B_4C$, BN, TiN, AlN, $TiO_2$, $ZrO_2$, $Al_2O_3$, ZnO, MgO, $B_2O_3$, and $Ta_2O_5$.

5. The process for producing a fiber bundle reinforced composite material according to claim 1, wherein after sintering through precipitation reaction, the composite material is subjected to at least one treatment selected from the group consisting of non-pressurized high temperature treatment, pressurized high temperature treatment and chemical vapor infiltration.

6. The process for producing a fiber bundle reinforced composite material according to claim 1, wherein at least one sintering aid is mixed in the starting materials, or impregnated into the sintered body after sintering through precipitation reaction.

* * * * *